United States Patent
Yoshino

(10) Patent No.: US 9,041,779 B2
(45) Date of Patent: May 26, 2015

(54) ELECTRONIC DEVICE AND RECORDING MEDIUM

(75) Inventor: Ken Yoshino, Koganei (JP)

(73) Assignee: NEC Corporation, Tokyo (JP)

( * ) Notice: Subject to any disclaimer, the term of this patent is extended or adjusted under 35 U.S.C. 154(b) by 921 days.

(21) Appl. No.: 12/692,313

(22) Filed: Jan. 22, 2010

(65) Prior Publication Data

US 2010/0189413 A1    Jul. 29, 2010

(30) Foreign Application Priority Data

Jan. 27, 2009  (JP) ................................ 2009-015787

(51) Int. Cl.
*H04N 13/04*   (2006.01)
*H04M 1/02*    (2006.01)

(52) U.S. Cl.
CPC ........... *H04N 13/0497* (2013.01); *H04M 1/021* (2013.01); *H04M 1/0222* (2013.01); *H04M 1/0235* (2013.01); *H04N 13/0413* (2013.01); *H04N 13/0454* (2013.01)

(58) Field of Classification Search
CPC .. G02B 27/2214; G02B 27/22; G06F 3/0346; G06F 3/0338; G06F 1/1624; G06F 1/1641; H04N 13/0454; H04N 13/0452; H04N 21/41407; G09G 2340/0492; H04M 1/0214; H04M 1/0216; H04M 1/0235; H04M 1/0237; H04M 1/0247
USPC .......................................................... 348/51
See application file for complete search history.

(56) References Cited

U.S. PATENT DOCUMENTS

| | | | |
|---|---|---|---|
| 2004/0041747 A1* | 3/2004 | Uehara et al. ...................... 345/6 |
| 2005/0099688 A1* | 5/2005 | Uehara et al. ................. 359/462 |
| 2005/0146620 A1* | 7/2005 | Monroe et al. ............. 348/208.2 |
| 2006/0126177 A1 | 6/2006 | Kim et al. | |
| 2006/0227103 A1* | 10/2006 | Koo et al. ...................... 345/156 |
| 2007/0111750 A1* | 5/2007 | Stohr et al. ................. 455/550.1 |
| 2007/0162942 A1* | 7/2007 | Hamynen et al. ............. 725/105 |

(Continued)

FOREIGN PATENT DOCUMENTS

| | | |
|---|---|---|
| CN | 1601448 | 3/2005 |
| JP | 03-119889 | 5/1991 |

(Continued)

OTHER PUBLICATIONS

Partial English Translation of an Office Action issued on Sep. 4, 2012 in the corresponding Japanese Patent Application No. 2010-156430.

(Continued)

*Primary Examiner* — Mehrdad Dastouri
*Assistant Examiner* — Obafemi Sosanya
(74) *Attorney, Agent, or Firm* — Cozen O'Connor

(57) ABSTRACT

An electronic device comprises a display unit, determination unit, parameter acquiring unit, and display control unit, and is configured as follows: the display unit can provide a three-dimensional display that makes an image stereoscopically viewable; the determination unit determines a posture of the display unit; the parameter acquiring unit acquires a control parameter that is related to the posture and intended to control a display operation of the display unit; the display control unit controls, on the basis of the control parameter acquired by the parameter acquiring unit, the display operation of the display unit, which is associated with the three-dimensional display.

16 Claims, 18 Drawing Sheets

(56) References Cited

U.S. PATENT DOCUMENTS

| | | | |
|---|---|---|---|
| 2007/0280546 A1* | 12/2007 | Kwak et al. | 382/251 |
| 2007/0293283 A1* | 12/2007 | Inubushi et al. | 455/575.1 |
| 2008/0194303 A1 | 8/2008 | Takagi et al. | |
| 2008/0266387 A1* | 10/2008 | Krijn et al. | 348/51 |
| 2009/0011751 A1 | 1/2009 | Goto | |
| 2009/0239586 A1* | 9/2009 | Boeve et al. | 455/566 |

FOREIGN PATENT DOCUMENTS

| | | |
|---|---|---|
| JP | 04-273292 | 9/1992 |
| JP | 6-214323 | 8/1994 |
| JP | 09-074574 | 3/1997 |
| JP | 9-159970 | 6/1997 |
| JP | 2002-281526 | 9/2002 |
| JP | 2003-060759 | 2/2003 |
| JP | 2003-319043 | 11/2003 |
| JP | 2004-229083 | 8/2004 |
| JP | 2004-320189 | 11/2004 |
| JP | 2005-038217 | 2/2005 |
| JP | 2005-157332 | 6/2005 |
| JP | 2006-018282 | 1/2006 |
| JP | 2006-119634 | 5/2006 |
| JP | 2006-121553 | 5/2006 |
| JP | 2006-154809 | 6/2006 |
| JP | 2006-203668 | 8/2006 |
| JP | 2007-094129 | 4/2007 |
| JP | 2008-035022 | 2/2008 |
| JP | 2008-170841 | 7/2008 |
| JP | 2008-199385 | 8/2008 |
| JP | 2008-236501 | 10/2008 |
| JP | 2008-288839 | 11/2008 |
| JP | 2009-010869 | 1/2009 |

OTHER PUBLICATIONS

Partial English Translation of an Office Action dated Jan. 8, 2013 issued in the corresponding Japanese Patent Application No. 2010-156430.

* cited by examiner

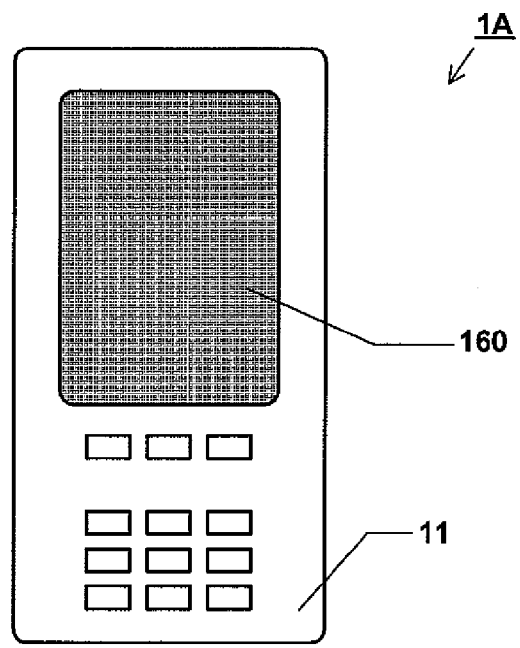
FIG. 1A
FIG. 1B   FIG. 1C
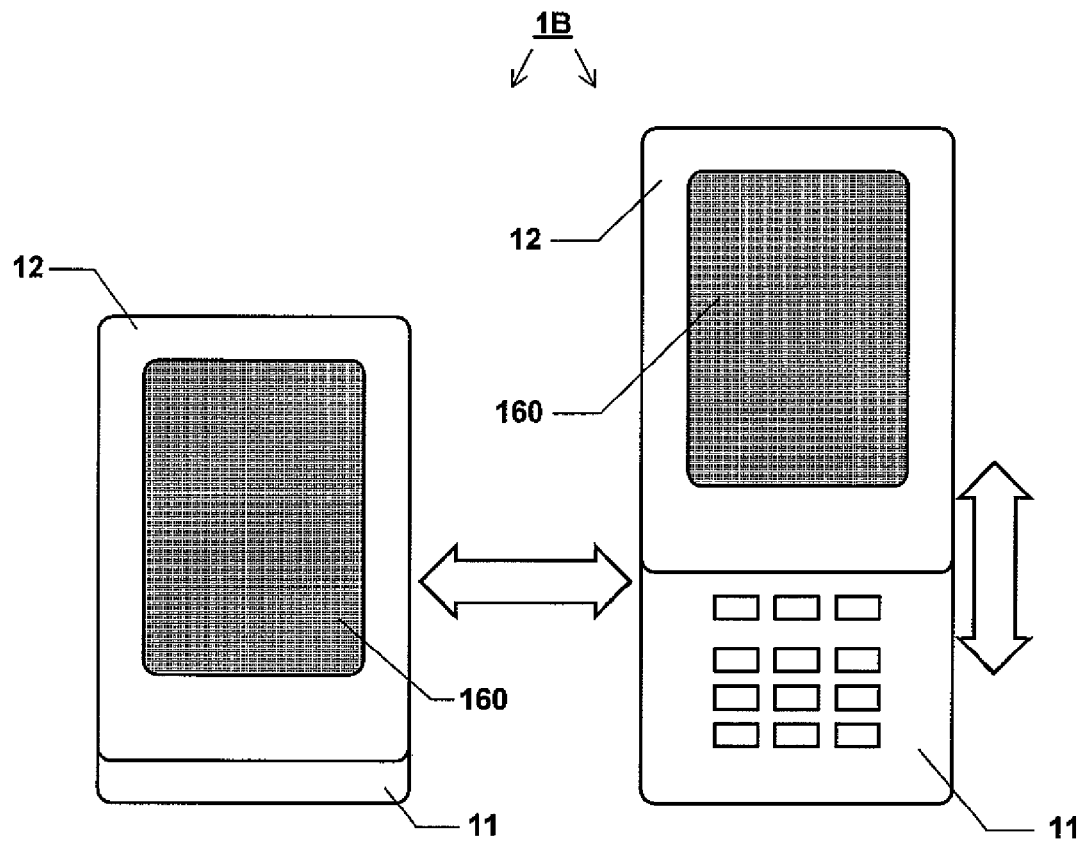

FIG. 4A
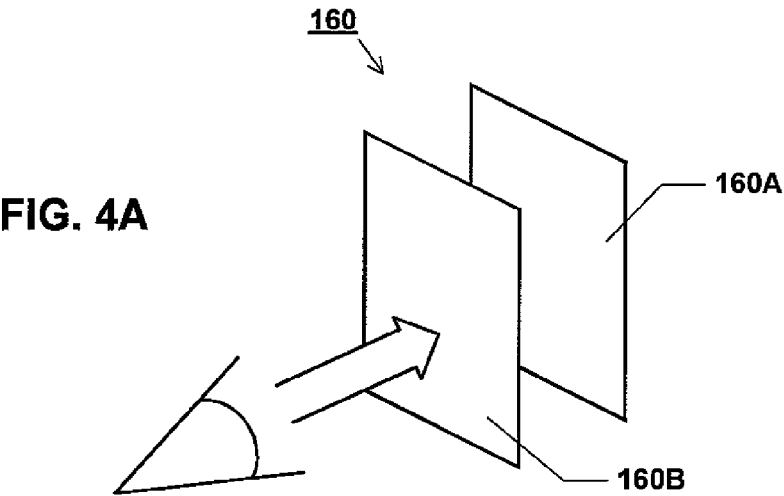
FIG. 4B  FIG. 4C
IMAGE FOR LEFT EYE  IMAGE FOR RIGHT EYE
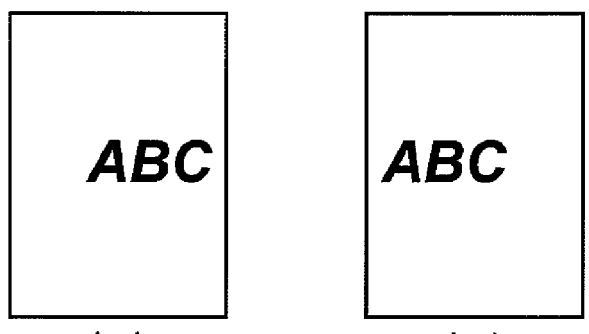
FIG. 4D

FIG. 6

PARAMETER TABLE

| SCREEN DIRECTION | CONDITIONAL PARAMETERS | | CONTROL PARAMETERS | |
|---|---|---|---|---|
| | DISTANCE BETWEEN EYES | VISUAL DISTANCE | DISPLAY PANEL | BARRIER PATTERN |
| VERTICAL | ⋮ | ⋮ | ⋮ | ⋮ |
| | ~~5.0cm~~ | ~~40cm~~ | [CONTROL VALUES FOR EACH LINE] | [CONTROL VALUES FOR EACH LINE] |
| | | 45cm | [CONTROL VALUES FOR EACH LINE] | [CONTROL VALUES FOR EACH LINE] |
| | | ⋮ | ⋮ | ⋮ |
| | 5.5cm | 40cm | [CONTROL VALUES FOR EACH LINE] | [CONTROL VALUES FOR EACH LINE] |
| | | 45cm | [CONTROL VALUES FOR EACH LINE] | [CONTROL VALUES FOR EACH LINE] |
| | ⋮ | ⋮ | ⋮ | ⋮ |
| HORIZONTAL | ⋮ | ⋮ | ⋮ | ⋮ |
| | ~~5.0cm~~ | ~~40cm~~ | [CONTROL VALUES FOR EACH LINE] | [CONTROL VALUES FOR EACH LINE] |
| | | 45cm | [CONTROL VALUES FOR EACH LINE] | [CONTROL VALUES FOR EACH LINE] |
| | | ⋮ | ⋮ | ⋮ |
| | 5.5cm | 40cm | [CONTROL VALUES FOR EACH LINE] | [CONTROL VALUES FOR EACH LINE] |
| | | 45cm | [CONTROL VALUES FOR EACH LINE] | [CONTROL VALUES FOR EACH LINE] |
| | ⋮ | ⋮ | ⋮ | ⋮ |
| OBLIQUE | ⋮ | ⋮ | ⋮ | ⋮ |
| | ~~5.0cm~~ | ~~40cm~~ | [CONTROL VALUES FOR EACH LINE] | [CONTROL VALUES FOR EACH LINE] |
| | | 45cm | [CONTROL VALUES FOR EACH LINE] | [CONTROL VALUES FOR EACH LINE] |
| | | ⋮ | ⋮ | ⋮ |
| | ⋮ | | | |

 DEFAULT VALUE (VALUE PREVIOUSLY USED)

FIG. 8
OPERATION SETTING TABLE
| DISPLAY MODE | 3D | 2D |
|---|---|---|
| 3D DISPLAY IN VERTICALLY LONG STATE | YES | NO |
| DISPLAY IN OBLIQUE STATE | ON | OFF |
| 3D DISPLAY IN OBLIQUE STATE | YES | NO |
| ⋮ | ⋮ | ⋮ |
 ENABLED      DISABLED

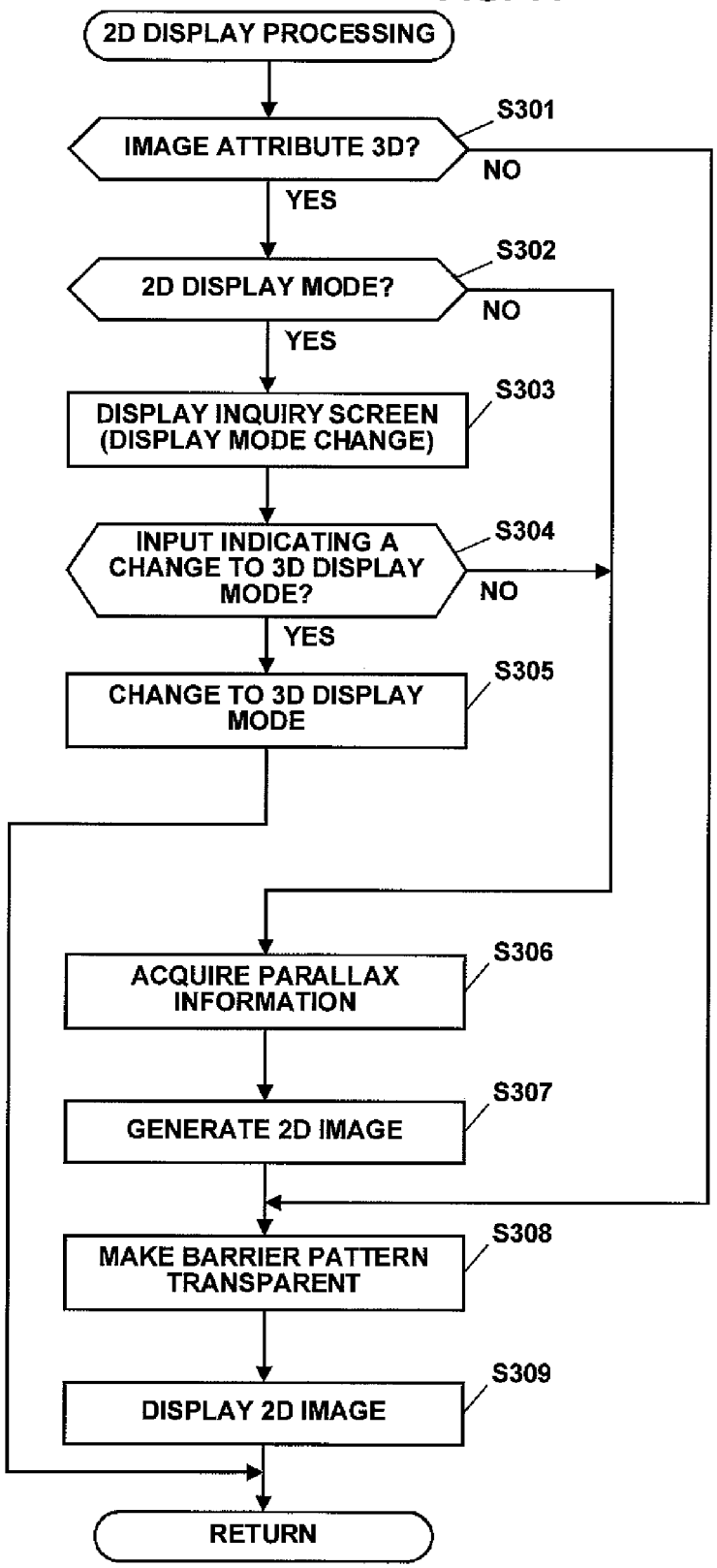

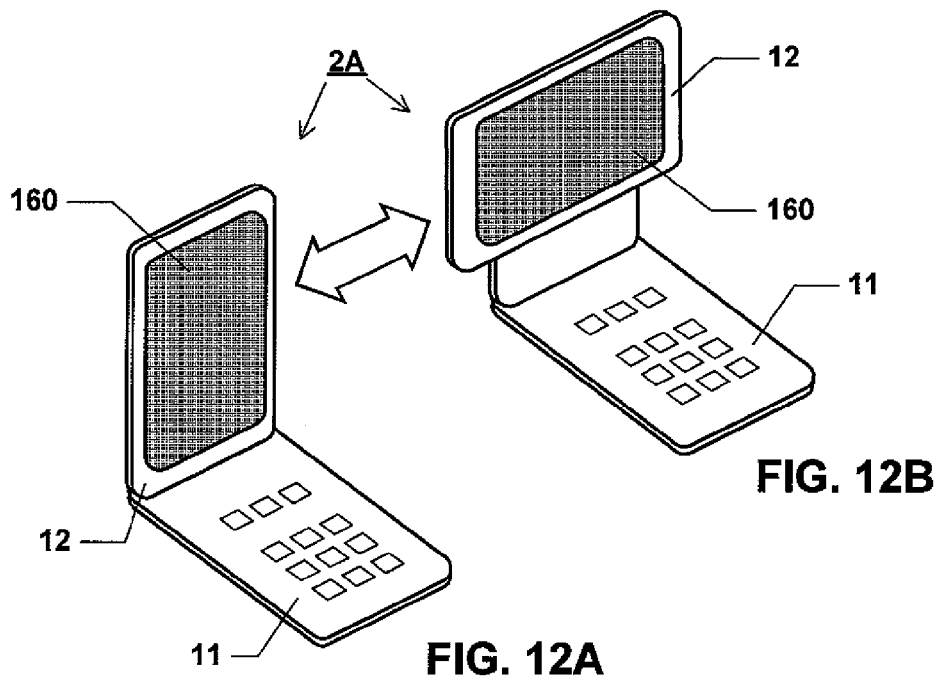
FIG. 12B
FIG. 12A
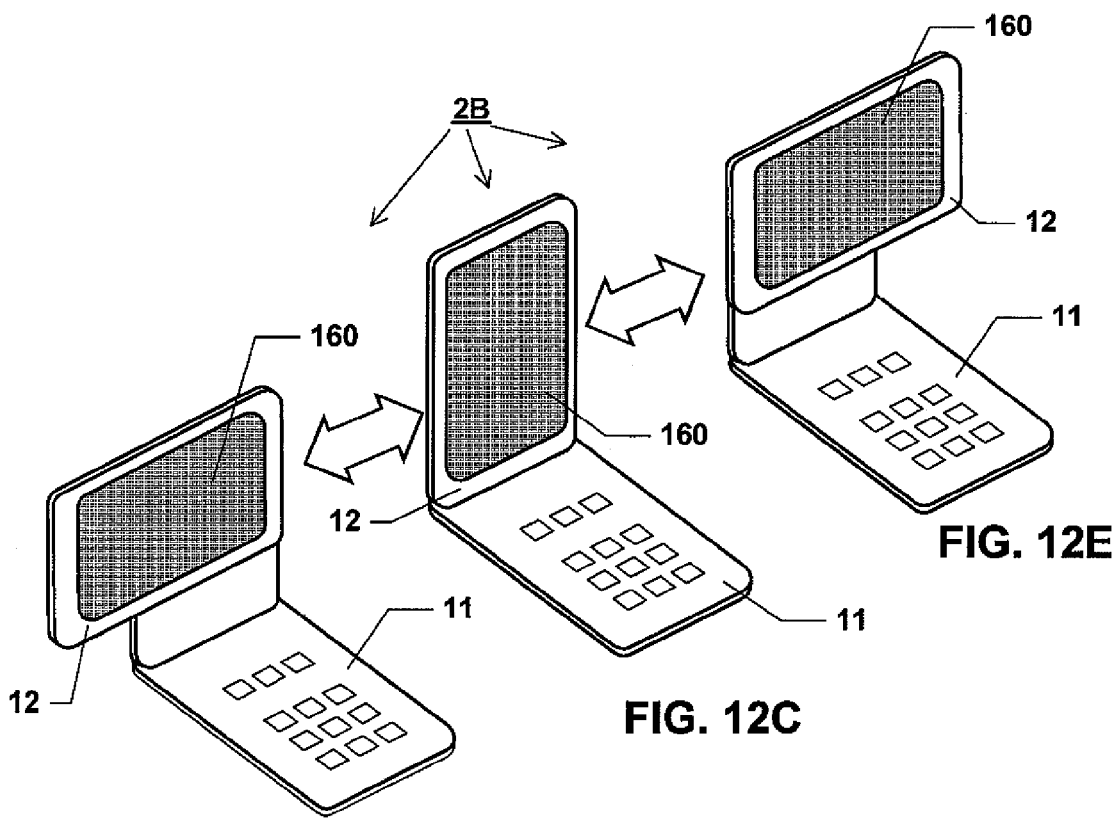
FIG. 12E
FIG. 12C
FIG. 12D

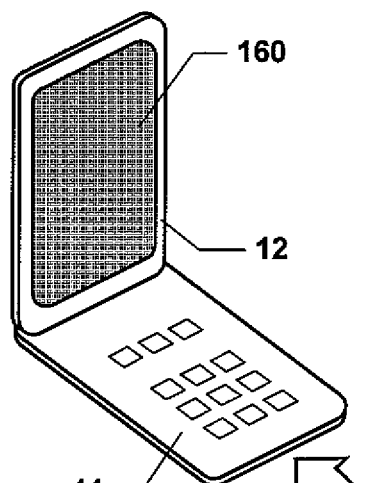
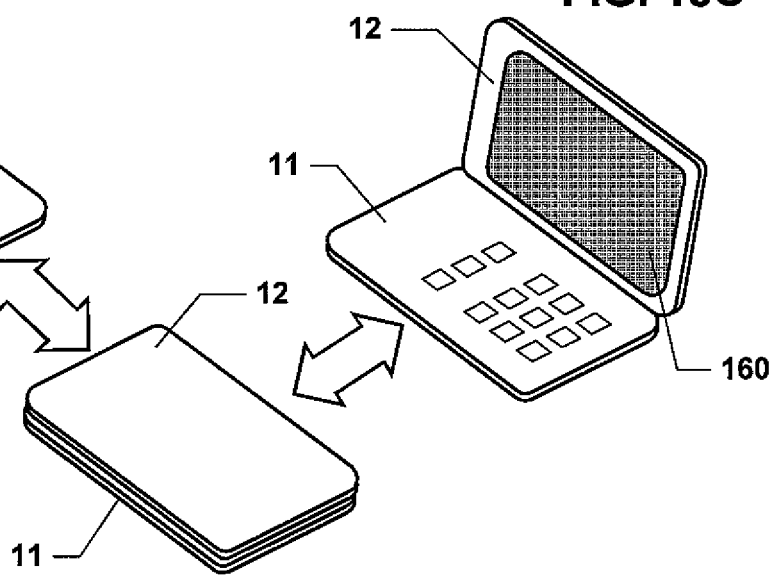
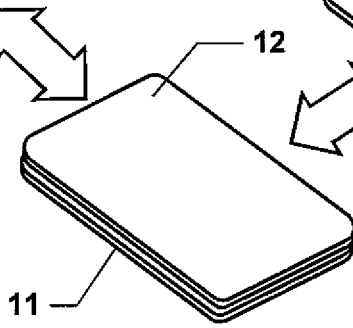
FIG. 13B
FIG. 13C
FIG. 13A

FIG. 16

PARAMETER TABLE

| SCREEN DIRECTION | CONDITIONAL PARAMETERS | | CONTROL PARAMETERS | |
|---|---|---|---|---|
| | DISTANCE BETWEEN EYES | VISUAL DISTANCE | DISPLAY PANEL | BARRIER PATTERN |
| VERTICAL | ⋮ | ⋮ | ⋮ | ⋮ |
| | *5.0cm* | *40cm* | [CONTROL VALUES FOR EACH LINE] | [CONTROL VALUES FOR EACH LINE] |
| | | 45cm | [CONTROL VALUES FOR EACH LINE] | [CONTROL VALUES FOR EACH LINE] |
| | | ⋮ | ⋮ | ⋮ |
| | 5.5cm | 40cm | [CONTROL VALUES FOR EACH LINE] | [CONTROL VALUES FOR EACH LINE] |
| | | 45cm | [CONTROL VALUES FOR EACH LINE] | [CONTROL VALUES FOR EACH LINE] |
| | ⋮ | ⋮ | ⋮ | ⋮ |
| HORIZONTAL (RIGHT) | *5.0cm* | *40cm* | [CONTROL VALUES FOR EACH LINE] | [CONTROL VALUES FOR EACH LINE] |
| | | 45cm | [CONTROL VALUES FOR EACH LINE] | [CONTROL VALUES FOR EACH LINE] |
| | | ⋮ | ⋮ | ⋮ |
| | 5.5cm | 40cm | [CONTROL VALUES FOR EACH LINE] | [CONTROL VALUES FOR EACH LINE] |
| | | 45cm | [CONTROL VALUES FOR EACH LINE] | [CONTROL VALUES FOR EACH LINE] |
| | ⋮ | ⋮ | ⋮ | ⋮ |
| HORIZONTAL (LEFT) | *5.0cm* | *40cm* | [CONTROL VALUES FOR EACH LINE] | [CONTROL VALUES FOR EACH LINE] |
| | | 45cm | [CONTROL VALUES FOR EACH LINE] | [CONTROL VALUES FOR EACH LINE] |
| | | ⋮ | ⋮ | ⋮ |
| | 5.5cm | 40cm | [CONTROL VALUES FOR EACH LINE] | [CONTROL VALUES FOR EACH LINE] |
| | | 45cm | [CONTROL VALUES FOR EACH LINE] | [CONTROL VALUES FOR EACH LINE] |
| | ⋮ | ⋮ | ⋮ | ⋮ |

 DEFAULT VALUE (VALUE PREVIOUSLY USED)

| SCREEN DIRECTION | CONDITIONAL PARAMETERS | |
|---|---|---|
| | DISTANCE BETWEEN EYES | VISUAL DISTANCE |
| VERTICAL | ⋮ | ⋮ |
| | *5.0cm* | *40cm* |
| | | 45cm |
| | | ⋮ |
| | 5.5cm | 40cm |
| | | 45cm |
| | ⋮ | ⋮ |
| HORIZONTAL | ⋮ | ⋮ |
| | *5.0cm* | *40cm* |
| | | 45cm |
| | | ⋮ |
| | 5.5cm | 40cm |
| | | 45cm |
| | ⋮ | ⋮ |
| OBLIQUE | ⋮ | ⋮ |
| | *5.0cm* | *40cm* |
| | | 45cm |
| | ⋮ | ⋮ |
| | ⋮ | |

DEFAULT VALUE (VALUE PREVIOUSLY USED)

ELECTRONIC DEVICE AND RECORDING MEDIUM

CROSS-REFERENCE TO RELATED APPLICATION

This application claims the benefit of Japanese Patent Application No. 2009-015787, filed on Jan. 27, 2009, the entire disclosure of which is incorporated by reference herein.

FIELD

This application relates generally to an electronic device and a recording medium, and more particularly, to an electronic device used preferably for stereoscopic image display, and a recording medium.

BACKGROUND

Mobile communication terminals, such as a cellular phone, have been experiencing improvement into the ever-higher performance of additional functions involving image display, such as a camera function and a TV broadcast receiving function. This advancement is accompanied by emergence of diversified structures of the display device. Although many conventional mobile communication terminals are equipped with a vertically long screen, a screen of horizontally long shape is suitable for use as a TV screen. Therefore, common mobile communication terminal come to provide a display device that can display images on a screen turned into a position where the screen is horizontally long.

In such mobile communication terminals, a display direction of an image is changed by detecting the horizontally long state of the casing itself. Besides, among mobile communication terminals having a foldable casing, one in which, by configuring that only a part corresponding to a display device can be rotated, only the display device can be directed in a vertically long direction or a horizontally long direction depending on the intended use is also used in practice. Thus, display control, depending on a plurality of screen directions, is performed.

Regarding a display device used for such a mobile communication terminal, one using a liquid crystal display panel is mainstream, and a stereoscopic image display technique using a liquid crystal display technique has also been established (for example, Japanese Patent No. 2857429).

Also, in such a stereoscopic image display technique, there is also a technique that can easily provide a three-dimensional image display without discomfort on the basis of a two-dimensional image (for example, Unexamined Japanese Patent Application KOKAI Publication No. 2004-320189).

By using the techniques as described above, a stereoscopic image display can be easily provided even in a small electronic device such as a mobile communication terminal. However, a stereoscopic image has the disadvantage of being difficult to visually recognize displays unless the display control that meets conditions upon viewing (e.g., visual distance and angle, distance between viewer's eyes, and the like) is performed. As described above, in any mobile communication terminal, a variety of configurations are available for a display device. Therefore, a user is unable to appropriately visually recognize a stereoscopic image when a posture of the device is changed, problematically.

SUMMARY

The present invention is made in consideration of the above situations, and provides an electronic device that can achieve a stereoscopic image display having high visibility, and a recording medium.

An electronic device according to the first aspect of the present invention comprises:
a display unit that can provide a three-dimensional display making an image stereoscopically viewable;
a determination unit that determines a posture of the display unit; and
a display control unit that, on a basis of the posture determined by the determination unit, controls a display operation of the display unit, the display operation being associated with the three-dimensional display.

A recording medium according to the second aspect of the present invention records a program that instructs a computer to function as:
a display unit that can provide a three-dimensional display making an image stereoscopically viewable;
a determination unit that determines a posture of the display unit; and
a display control unit that, on a basis of the posture determined by the determination unit, controls a display operation of the display unit, the display operation being associated with the three-dimensional display.

Effect of the Invention

According to the present invention, the visibility of a stereoscopic image display can be improved.

BRIEF DESCRIPTION OF THE DRAWINGS

A more complete understanding of this application can be obtained when the following detailed description is considered in conjunction with the following drawings, in which:

FIG. 1A is a diagram illustrating an example of a straight type mobile communication terminal according to the first embodiment of the present invention;

FIG. 1B is a diagram illustrating an example of a slide type mobile communication terminal according to the first embodiment of the present invention;

FIG. 1C is a diagram illustrating the example of the slide type mobile communication terminal according to the first embodiment of the present invention;

FIG. 4A is a diagram schematically illustrating a configuration of a display unit;

FIG. 4B is a diagram illustrating an example of an image for left eye, displayed on the display unit;

FIG. 4C is a diagram illustrating an example of an image for right eye, displayed on the display unit;

FIG. 4D is a diagram illustrating an example of a pixel array of a 3D image;

FIG. 6 is a diagram illustrating an example of a "parameter table" stored in the storage unit illustrated in FIG. 3;

FIG. 8 is a diagram illustrating an example of an "operation setting table" stored in the storage unit illustrated in FIG. 3;

FIG. 11 is a flowchart for describing "2D display processing" performed in the "display control processing" illustrated in FIG. 9;

FIGS. 12A and 12B are diagrams illustrating an example of a swing type mobile communication terminal according to the second embodiment of the present invention;

FIGS. 12C to 12E are diagrams illustrating an example of a swing type mobile communication terminal according to the second embodiment of the present invention;

FIGS. 13A to 13C are diagrams illustrating an example of a mobile communication terminal that can be opened/closed in different directions, according to the second embodiment of the present invention;

FIGS. 16 and 17 are diagrams illustrating other examples of the "parameter table" illustrated in FIG. 6.

DETAILED DESCRIPTION OF THE PREFERRED EMBODIMENTS

Embodiments according to the present invention will hereinafter be described with reference to the drawings.

First Embodiment

In the present embodiment, there is described a case where an electronic device according to the present invention is included as, for example, a mobile communication terminal such as a cellular phone. In the present embodiment, a mobile communication terminal as illustrated in FIG. 1 is envisaged.

In FIGS. 1A to 1C, FIG. 1A illustrates an example of a so-called "straight type" mobile communication terminal 1A, and FIGS. 1B and 1C illustrate an example of a so-called "slide type" mobile communication terminal 1B.

The mobile communication terminal 1A has, as illustrated in FIG. 1A, for example, operation buttons and a display unit 160 on a casing 11 held by a user.

Also, the mobile communication terminal 1B includes, as illustrated in FIGS. 1B and 1C, a casing 11 held by a user, and a casing 12 that slides parallel to the casing 11, and has a display unit 160 on the casing 12.

Figure 2A:
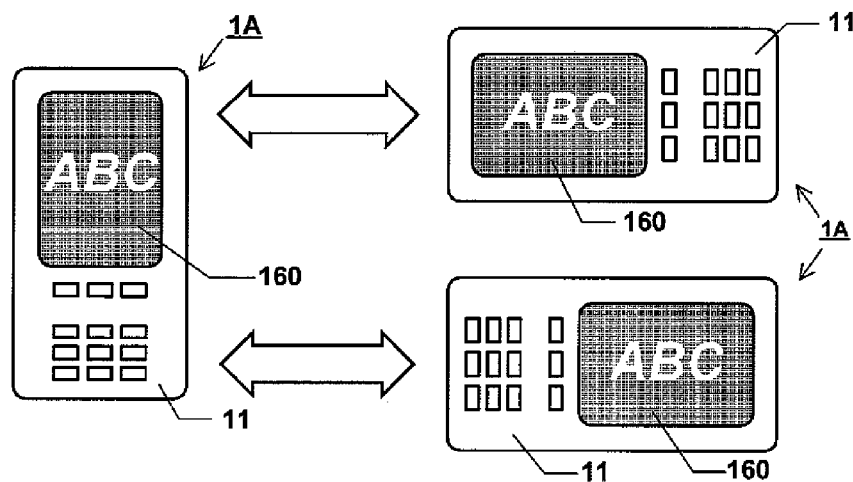
FIG. 2A is a diagram illustrating a relationship between a posture (direction) of a casing and a screen direction in a straight type mobile communication terminal illustrated in FIG. 1A.

In both of the mobile communication terminals 1A and 1B, a screen direction of the display unit 160 is linked to a direction (posture) of the casing 11 held by a user. For example, in the case of the straight type mobile communication terminal 1A, as illustrated in FIG. 2A, when the casing 11 itself is vertical, a screen of the display unit 160 is brought into a vertically long state, whereas when the casing 11 itself is horizontal, the screen of the display unit 160 is brought into a horizontally long state.

Figure 2B:
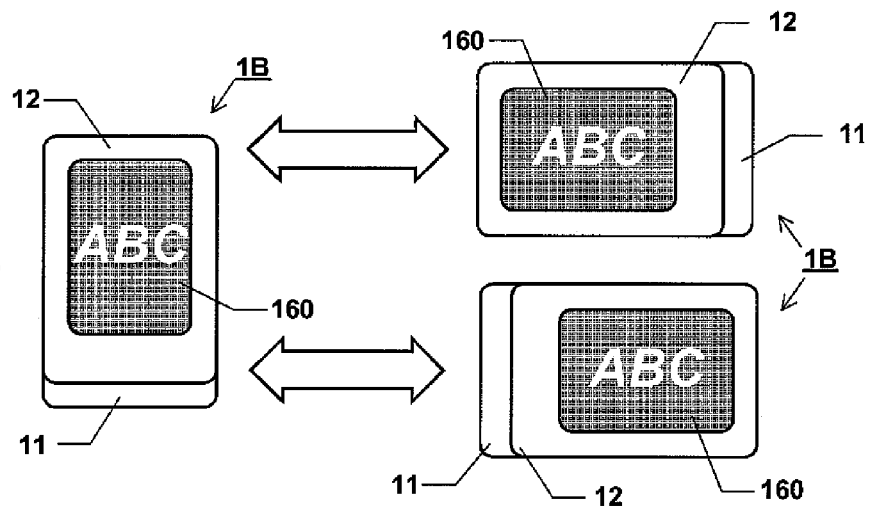
FIG. 2B is a diagram illustrating a relationship between a posture (direction) of a casing and a screen direction in a slide type mobile communication terminal in the state illustrated in FIG. 1B.
Figure 2C:
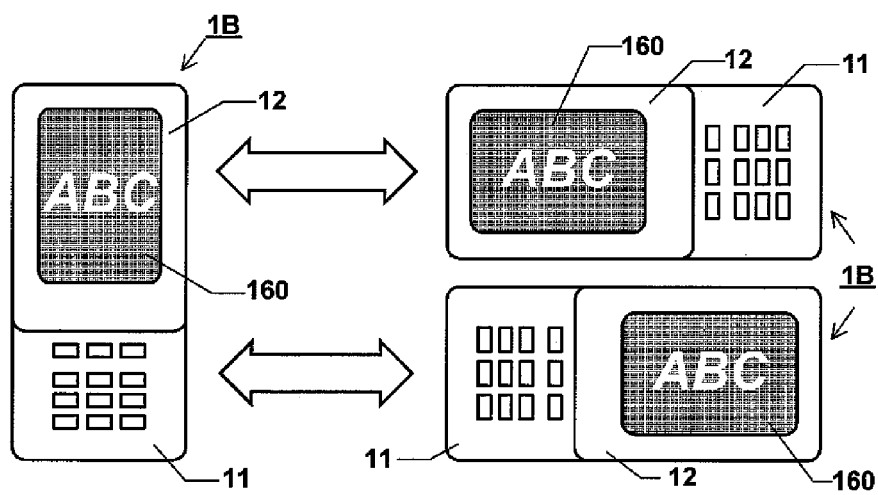
FIG. 2C is a diagram illustrating a relationship between the posture (direction) of the casing and the screen direction in the slide type mobile communication terminal in the state illustrated in FIG. 1C.

FIG. 2B illustrates a relationship between the posture of the casing 11 and the screen direction in the slide type mobile communication terminal 1B in a state illustrated in FIG. 1B, and FIG. 2C a relationship between the posture of the casing 11 and the screen direction in the slide type mobile communication terminal 1B in a state illustrated in FIG. 1C. Similar to the case of the mobile communication terminal 1A, when the casing 11 itself is vertical, a screen of the display unit 160 is brought into a vertically long state, whereas when the casing 11 itself is horizontal, the screen of the display unit 160 is brought into a horizontally long state.

In the following, in the present invention, in each of FIGS. 2A to 2C, a direction of the mobile communication terminal 1A or 1B illustrated on the left-hand sides of both arrows is defined as a "vertical direction", and a corresponding screen direction of the display unit 160 as a "vertically long direction". Similarly, in each of FIGS. 2A to 2C, a direction of the mobile communication terminal 1A or 1B illustrated on the right-hand sides of the both arrows is defined as a "horizontal direction", and a corresponding screen direction of the display unit 160 as a "horizontally long direction".

Figure 3:
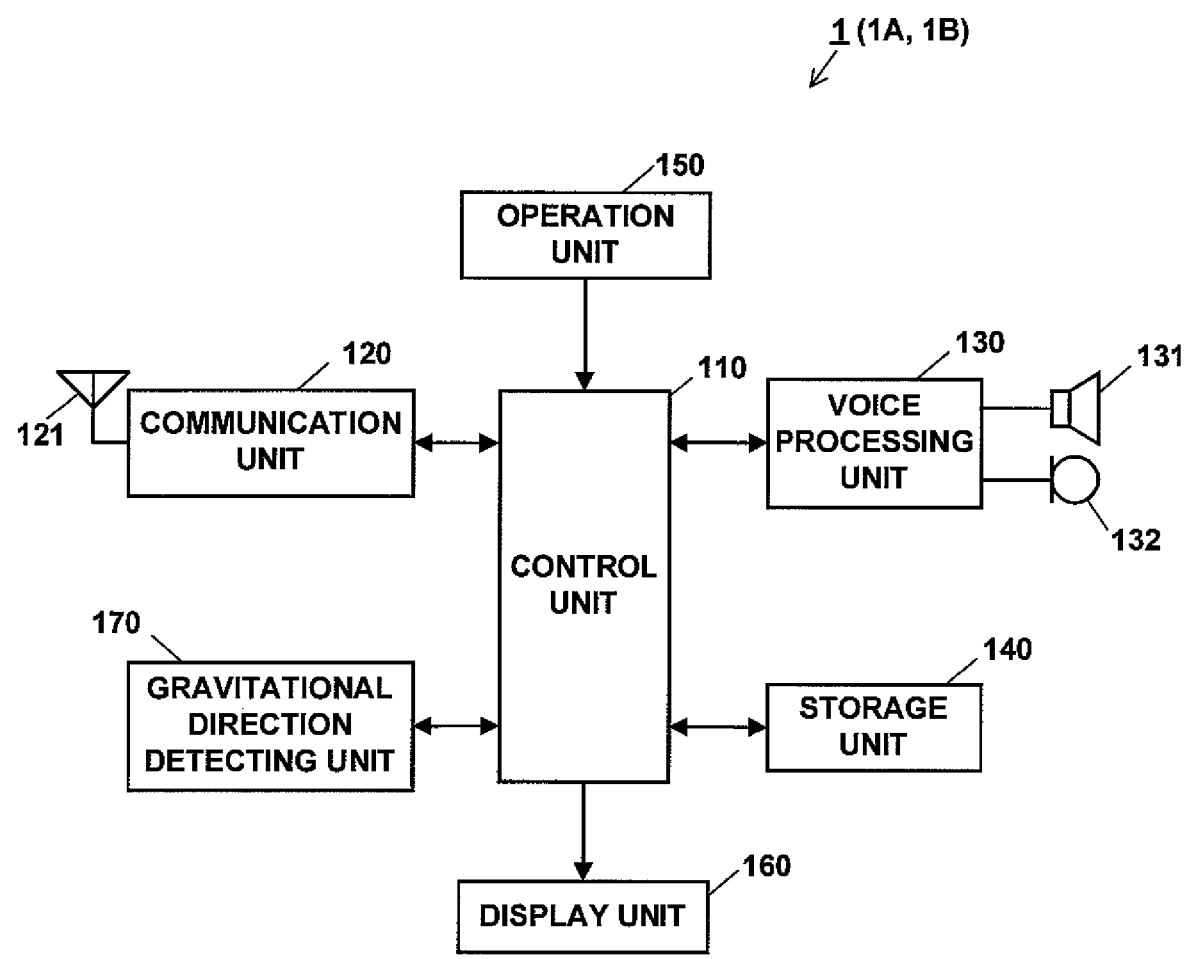
FIG. 3 is a block diagram illustrating an internal configuration of the mobile communication terminal according to the first embodiment of the present invention.

An internal configuration of the mobile communication terminal 1A or 1B (collectively referred to as a "mobile communication terminal 1") having such a casing structure is described with reference to FIG. 3. FIG. 3 is a block diagram illustrating the internal configuration of the mobile communication terminal 1.

As illustrated in the diagram, the mobile communication terminal 1 comprises a control unit 110, communication unit 120, voice processing unit 130, storage unit 140, operation unit 150, display unit 160, and gravitational direction detecting unit 170.

The control unit 110 includes, for example, a CPU (Central Processing Unit), and a RAM (Random Access Memory) serving as a work area, and it executes a predetermined operation program to thereby control the respective parts of the mobile communication terminal 1. That is, the respective components of the mobile communication terminal 1 are controlled by the control unit 110, and information transmission between the respective components is performed through the control unit 110.

The communication unit 120 is a component associated with wireless access at the time when the mobile communication terminal 1 makes communication, which includes, for example, a communication device using a communication system such as a CDMA (Code Division Multiple Access) system or GSM (Global Systems for Mobile Communications) system, and the like, and performs wireless transmission/reception through an antenna 121 corresponding to the communication system to thereby allow wireless communication with an adjacent base station.

The voice processing unit 130 includes, for example, a codec circuit for voice data, and the like, and performs processing associated with voice input/output of the mobile communication terminal 1. That is, the voice processing unit 130 performs a voice receiving operation that converts digital voice data received by the communication unit 120 into an analog voice signal to output it from a speaker 131, and a voice transmitting operation that converts the user's speech voice inputted from a microphone 132 into digital voice data to transmit it to the communication unit 120, and the like.

The storage unit 140 includes, for example, a storage device such as a flash memory, and stores the operation program executed by the control unit 110, and also, various pieces of data necessary to embody the present invention.

The operation unit 150 includes, for example, buttons, keys, or the like, that are formed on the outer surface of the casing 11, and is operated by the user of the mobile communication terminal 1. The operation unit 150 comprises an input circuit connected to the respective buttons, keys, or the like, and generates an input signal according to the user's operation to transmit the input signal to the control unit 110.

The display unit 160 is a display output device including, for example, a liquid crystal display device, and displays and outputs an image and the like according to the control of the control unit 110. The display unit 160 according to the present embodiment is assumed to be a display device that can provide a stereoscopic image display (hereinafter referred to as a "3D display"). A configuration of the display unit 160 capable of providing such a 3D display is described with reference to FIG. 4A.

The display unit 160 according to the present embodiment includes, as illustrated in FIG. 4A, a display panel 160A and a parallax barrier panel 160B to thereby achieve the 3D display.

The display panel 160A includes, for example, a liquid crystal display panel, and displays an image.

The parallax barrier panel 160B has a similar configuration to a liquid crystal display panel, and controls transmission of light generated due to the image displayed on the display panel 160A. For this reason, the parallax barrier panel 160B is configured in the display unit 160 so as to be positioned between the display panel 160A and a person who views the screen of the display panel 160A (the person is a user of the mobile communication terminal 1, or the like. Hereinafter the user is referred to as a "viewer").

An operating principle on the basis of which the display unit 160 having such a configuration provides a 3D display is described with reference to FIGS. 4B to 4D and FIGS. 5A and 5B.

In the case of using the parallax barrier panel 160B to provide the 3D display, parallax between right and left eyes is used. For this reason, in the case where the display unit 160 provides the 3D display, images for the left and right eyes as illustrated in FIGS. 4B and 4C, respectively, are prepared. The images for the left and right eyes (hereinafter referred to as "left and right images") both indicate the same display object, but are displaced in right and left directions depending on the parallax.

The display panel 160A of the display unit 160 provides a display with horizontally alternating display positions of pixels constituting the image for the left eye and those of pixels constituting the image for the right eye. For example, as illustrated in FIG. 4D, an image is displayed on the screen, in which the pixels constituting the image for the right eye and those constituting the image for the left eye are arrayed in odd number columns and even number columns, respectively.

In other words, each of the images for the left and right eyes is displayed such that the pixels thereof are arrayed in every other column (line), and lines for the images for the left eye and those for the images for the right eye are alternated. Note that the pattern of the pixel array does not need to be on the one column basis, but, for example, the line may be formed from a plurality of pixels. Also, a pixel unit may not have an integer value.

As described, the display panel 160A displays the image (hereinafter referred to as the "3D image") in which the images for the left and right eyes are arrayed in stripe forms, respectively. Note that, by providing the display so as to make the lines formed by the pixels of the left eye image reach the left eye of the viewer and the lines formed by the pixels of the right eye image reach the right eye of the viewer, the two images having the parallax as illustrated in FIGS. 4B and 4C are recognized by respective corresponding one of the left and right eyes. As a result, the respective images are synthesized within the brain of the viewer, and visually recognized as a stereoscopic image.

In this case, the parallax barrier panel 160B performs an operation that displays the respective lines in the 3D image toward eyes corresponding to the respective lines. As described above, the parallax barrier panel 160B has a similar structure to a liquid crystal display panel, and therefore by controlling voltage application to an electrode corresponding to each of the pixels, the light generated due to the image display on the display panel 160A can be transmitted or shielded.

Figure 5A:
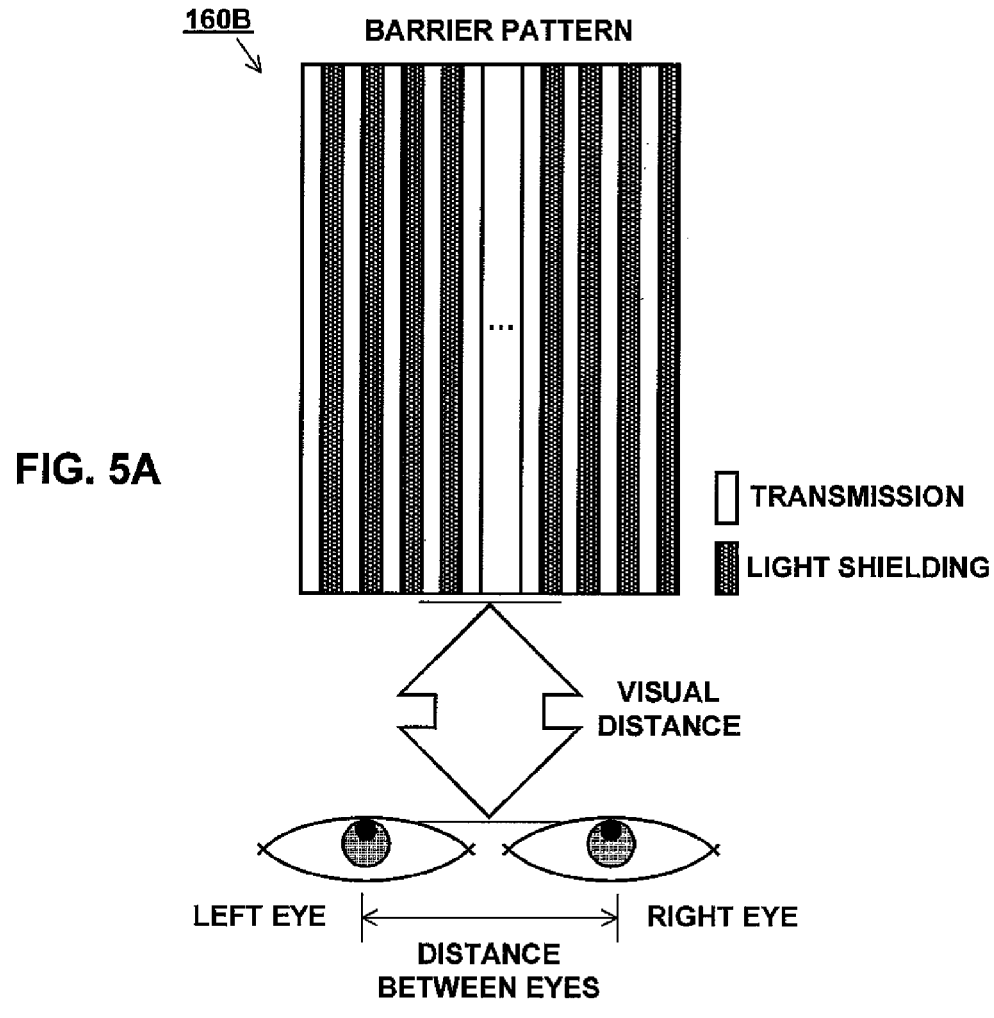
FIG. 5A is a diagram illustrating an example of a barrier pattern on a parallax barrier panel illustrated in FIG. 4A.
Figure 5B:
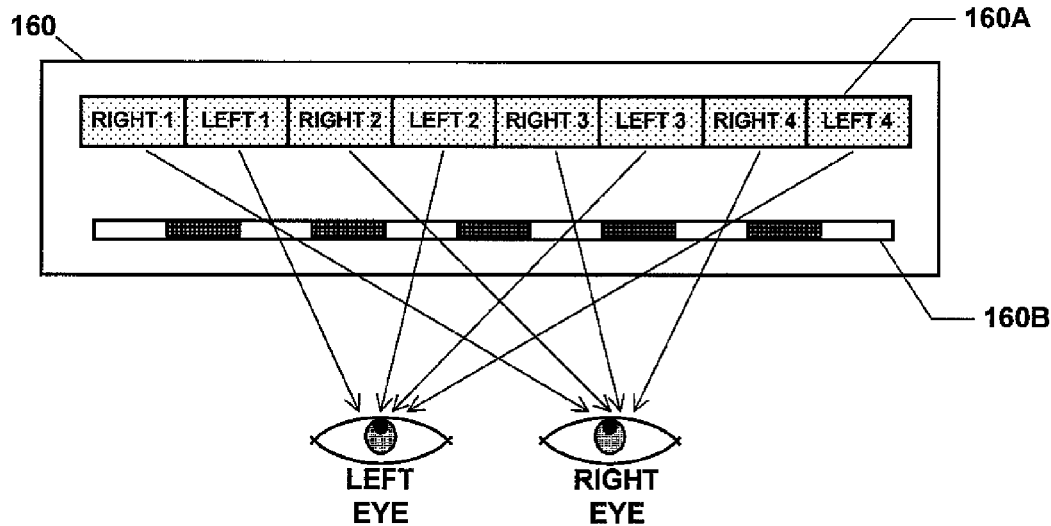
FIG. 5B is a diagram schematically illustrating an image transmission mechanism based on the barrier pattern.

That is, a striped barrier pattern as illustrated in FIG. 5A is formed corresponding to the lines of the 3D image displayed on the display panel 160A. Then, as illustrated in FIG. 5B, the right and left images displayed on the display panel 160A are respectively transmitted through transmission columns of the barrier pattern formed on the parallax barrier panel 16013 to reach the right and left eyes of the viewer.

To achieve this, transmission/non-transmission (light shielding) should be appropriately controlled for each of the stripes (lines, columns). In this case, it is only necessary to change the orientation of the direction of liquid crystal molecules by controlling the voltage applied to each of the stripes (lines, columns). This display control is changed depending on the distance from the viewer's eyes to the display unit 160 (hereinafter referred to as a "visual distance") and the interval between the right and left eyes of the viewer (hereinafter referred to as an "distance between eyes").

Accordingly, the present embodiment is adapted to appropriately visually recognize the 3D display by preparing a plurality of "conditional parameters" in which conditions (conditions upon viewing) varying depending on a viewer and viewing environment, such as the visual distance and the distance between eyes, are parameterized. The "conditional parameters" are stored in the storage unit 140. Also, in the present embodiment, for the respectively prepared conditional parameters, "control parameters" for forming an appropriate barrier pattern are set, and stored in relation to the conditional parameters stored in the storage unit 140. In the present embodiment, a "parameter table" as illustrated in FIG. 6 is assumed to be stored in the storage unit 140.

As illustrated, in the parameter table, for each of the screen directions of the display unit 160 (vertical or horizontal direction), the conditional parameters and the control parameters are related to each other. In this table, a plurality of combinations of the distance between eyes and the visual distance are set. Also, for each of the combinations, the control parameters for providing an appropriate 3D display are recorded. The control parameters are, for example, control values of the display panel 160A, which are set to appropriately display a 3D image depending on the screen direction, and control values (e.g., applied voltage, number of pixels included in a line, and the like) for each of the lines of the parallax barrier panel 160B, which are appropriate when the display is provided.

That is, in the case of displaying the 3D image as illustrated in FIG. 4D on the display panel 160A, and using the barrier pattern formed on the parallax barrier panel 160B to provide a 3D display, the 3D image is visually recognized as the 3D display under specific conditions, and therefore if the conditional parameters such as the visual distance and the distance between eyes are varied, the array of the left and right images in the 3D image should be changed. If the array of the left and right images is changed, the barrier pattern should be changed to a barrier pattern suited to the change. For this reason, for each of the combinations of the conditional parameters set for each of the screen directions, the control values of the display panel 160A for achieving an optimum array of the left and right images, and the control values of the parallax barrier panel 160B for forming a barrier pattern that is optimum in this case, are set as the control parameters.

Note that the control parameters of the display panel 160A are assumed to be set with respect to a period and order of the pixel array of the right and left images, depending on the resolution of the display panel 160A. Accordingly, the control parameters of the display panel 160A are set within a controllable resolution range, and therefore discrete to some extent. Also, if the pixel pitch between vertical pixels is different from the pixel pitch between horizontal pixels, or if the pixel aspect ratio between vertical and horizontal dimensions of each pixel is different, the control parameters of the display panel 160A take different control values depending on the screen direction.

Note that the distance between eyes in the conditional parameters has a fixed value for the same viewer, and therefore by setting default values, efficient processing can be performed. For example, if an initial screen display in the mobile communication terminal 1 is provided as a 3D display, the combination of general distance between eyes and visual distance is specified as a default value, but in subsequent displays, the parameters used for the previous 3D display are specified as default values. For this purpose, as indicated by hatching in FIG. 6, the parameter table is preliminarily prepared to be able to identify the default values.

Note that, in the example of FIG. 6, the visual distance and the distance between eyes are set as elements of the conditional parameters; however, an angle (viewing angle) between the viewer and the screen may be added to the elements.

Also, as illustrated in FIG. 6, each of the parameters is related to the screen direction of the display unit 160. That is, each of the parameters is set depending on the vertically long direction (vertical direction) or horizontally long direction (horizontal direction) as exemplified in FIGS. 2A to 2C. The direction of the mobile communication terminal 1, i.e., whether the screen direction of the display unit 160 is vertical or horizontal is determined by a detecting operation of the gravitational direction detecting unit 170 illustrated in FIG. 3.

The gravitational direction detecting unit 170 includes, for example, an acceleration sensor, which detects a gravitational direction acting on the mobile communication terminal 1, and outputs a signal resulting from the detection to input it to the control unit 110.

The above describes major configurations in the mobile communication terminal 1 according to the present embodiment, which are configurations necessary for the operation of the present invention, and the other configurations necessary to achieve main functions and additional functions of the mobile communication terminal 1 are assumed to be appropriately provided.

Operation of the mobile communication terminal 1 having the configuration as above is described. Note that the mobile communication terminal 1 according to the present invention is assumed to provide an image display depending on the screen direction by performing the display control of the display unit 160 in each of the cases where the posture (direction) of the mobile communication terminal 1 is vertical and horizontal as exemplified in FIGS. 2A to 2C. In this case, the display unit 160 according to the present embodiment is one capable of providing a 3D display, and therefore when an image display is controlled depending on the screen direction, controls the parallax barrier panel 160B such that the 3D display is appropriately visually recognized.

Figure 7:
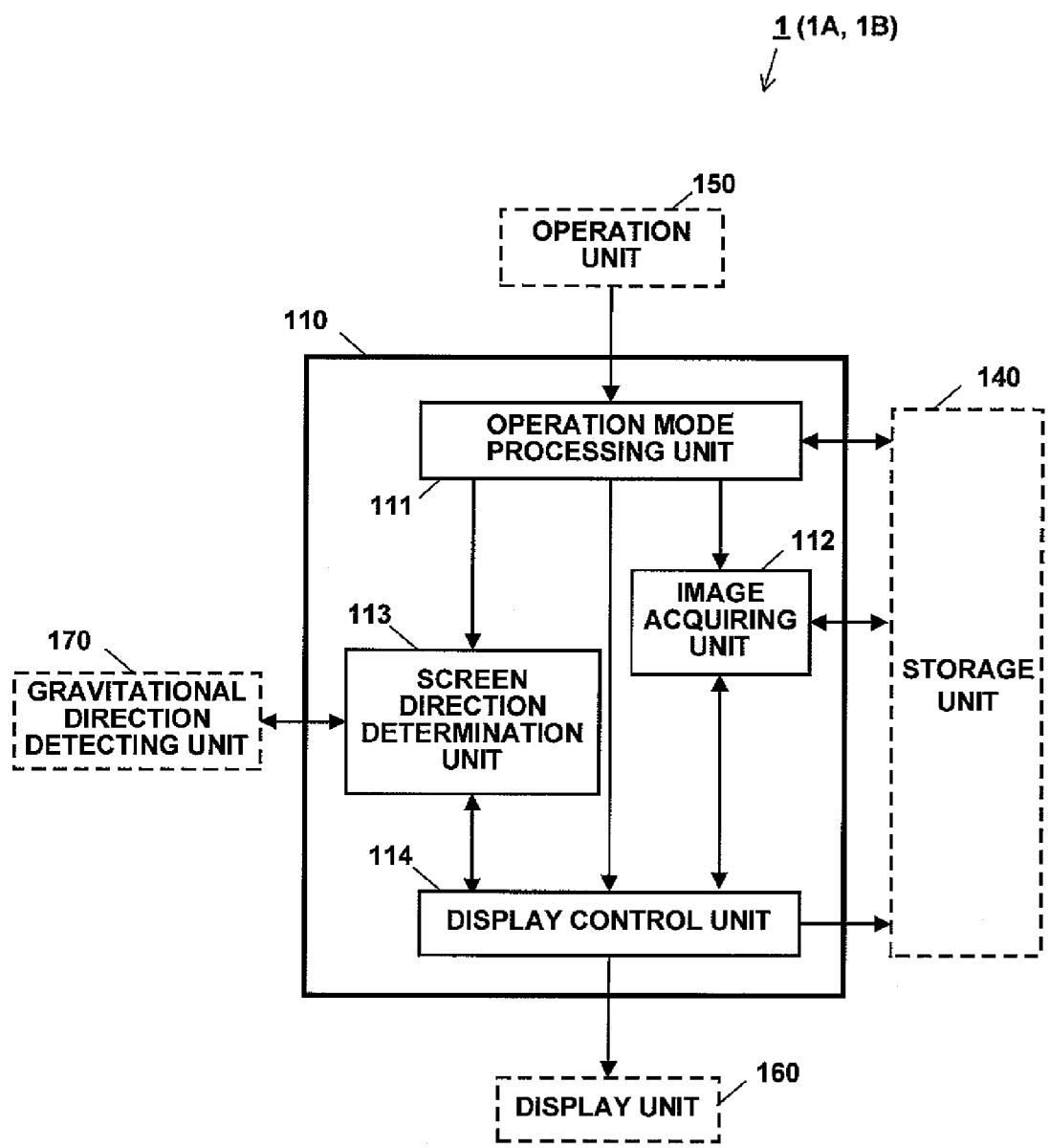
FIG. 7 is a diagram illustrating an example of a functional configuration achieved by a control unit illustrated in FIG. 3.

To perform such an operation, the control unit 110 executes the operation program stored in the storage unit 140, and thereby functions as illustrated in FIG. 7 are achieved. As illustrated in the diagram, the control unit 110 functions as an operation mode processing unit 111, image acquiring unit 112, screen direction determination unit 113, and display control unit 114.

The operation mode processing unit 111 designates an operation mode of the mobile communication terminal 1 in accord with a signal input by the operation unit 150 being operated by a user of the mobile communication terminal 1. Besides, the operation mode processing unit 111 issues an instruction to each of the functions that accords with the designated operation mode.

The image acquiring unit 112 acquires image data, attribute information on the image data and the like, at the time when the display unit 160 of the mobile communication terminal 1 provides a screen display. In the present embodiment, image data on an image created for 3D display, image data used for normal display (hereinafter referred to as "2D display"), or the like is acquired. Also, information indicating the attribute of the image data, i.e., whether the acquired data is data for the 3D display or 2D display, or the like, is acquired. These pieces of image data are assumed to be stored in, for example, the storage unit 140, and the image acquiring unit 112 appropriately acquires image data or the like necessary for screen display from the storage unit 140.

The screen direction determination unit 113 determines the screen display direction of the display unit 160 on the basis of the input signal from the gravitational direction detecting unit 170. In the present embodiment, as illustrated in FIGS. 2A to 2C, the posture (direction) of the mobile communication terminal 1 (casing 11) and the screen direction of the display unit 160 are linked to each other. Therefore, from a gravitational direction acting on the mobile communication terminal 1, which is detected by the gravitational direction detecting unit 170, it can be determined whether the posture (direction) of the mobile communication terminal 1 is in a vertical or horizontal direction. The screen direction determination unit 113 determines from the determined posture (direction) of the mobile communication terminal 1 whether the screen direction of the display unit 160 at the time is "vertically long" or "horizontally long".

The display control unit 114 selects parameters stored in the storage unit 140 on the basis of the operation mode specified by the operation mode processing unit 111, attribute of the image data acquired by the image acquiring unit 112, and screen direction of the display unit 160 determined by the screen direction determination unit 113. On the basis of the selected parameters, it controls the display operation of the display unit 160. In this case, the display control unit 114 is assumed to perform the display control according to operation settings of the display operation of the 3D display. The operation settings are assumed to be stored in the storage unit 140 as, for example, an "operation setting table" as illustrated in FIG. 8.

In this case, as illustrated in FIG. 8, operation setting items, for example, "Display mode", "3D display in vertically long state", "Display in oblique state", "3D display in oblique state", and the like are assumed to be prepared. In the example of FIG. 8, regarding "Display mode", "3D display in vertically long state", "Display in oblique state", and "3D display in oblique state", options "3D", "No", "On", and "No" are respectively set and enabled.

"Display mode" is a setting item that specifies whether or not a 3D display is provided on the display unit 160, and if the 3D display is provided, the option "3D" is enabled, on the basis of which, the display control unit 114 controls the display unit 160 to provide the 3D display. On the other hand, if the 3D display is not provided, the option "2D" is enabled, and on the basis of this setting, the display control unit 114 controls the display unit 160 not to provide the 3D display.

"3D display in vertically long state" is a setting item that is referred to when "Display mode" is set to "3D", and it specifies whether or not a 3D display is provided when the screen direction of the display unit 160 is "vertically long". If a 3D display is not provided when the screen direction is "vertically long", the option "No" is enabled, whereas when a 3D display is provided even when the screen direction is "vertically long", the option "Yes" is enabled.

As described above, the display unit 160 according to the present embodiment provides a 3D display using parallax between right and left eyes, and therefore an effect of the 3D display is more likely to appear on the horizontally long screen. On the other hand, on the vertically long screen, the effect of the 3D display may not be likely to appear. If it is better not to provide a 3D display when the screen direction is "vertically long", "No" is specified.

"Display in oblique state" is a setting item that specifies whether or not a screen display on the display unit 160 is provided when the posture (direction) of the mobile communication terminal 1 is oblique, i.e., the screen direction of the display unit 160 is oblique. If a display on the display unit 160 is not provided when the screen direction is oblique, the option "Off" is enabled, whereas if a screen display is provided even when the screen direction is "oblique", the option "On" is enabled.

Note that when the screen direction of the display unit 160 is "oblique" it corresponds to, for example, the middle of changing the posture (direction) of the mobile communication terminal 1 (casing 11) for a user of the mobile communication terminal 1 to change the screen direction from the "vertical long" state to the "horizontally long" state, or other situation. As described above, in the case where a 3D display is provided on the display unit 160, the barrier pattern is formed by the parallax barrier panel 160B; however, if the screen direction is oblique, the direction of an image being displayed on the display panel 160A also becomes oblique, and therefore a barrier pattern suited to this should be made.

In this case, when the screen direction is "vertically long" or "horizontally long", a simple stripe barrier pattern is only required; however, in the middle of changing the posture (direction) of the mobile communication terminal 1 (casing 11), an angle is successively changed. In this case, processing becomes complicated, and the display control cannot follow the change in angle, so the display quality of a 3D display may be reduced. Also, it may be difficult to finely form the oblique barrier pattern itself. Accordingly, in such a case, on the basis of the "Display in oblique state" setting, control can be performed to make the display unit 160 stop providing a display while the screen direction is oblique.

"3D display in oblique state" is a setting item that is referred to when "Display in oblique state" is set to "On". It is a setting that, although a display is provided even when the screen direction is oblique, specifies whether the display at the time is a 3D or 2D display. If when the screen direction is oblique, a 3D display is not provided but switches to a 2D display, the option "No" is enabled, whereas if the 3D display is provided even when the screen direction is oblique, the option "Yes" is enabled. As described above, the 3D display in the oblique state may be reduced in display quality, and therefore on the basis of a setting of this item, the switch to a 2D display can be set while the screen direction is oblique.

Each of these setting items is set on the basis of, for example, an operation of the operation unit 150 by a user of the mobile communication terminal 1, or other means.

Processing performed on the basis of the functional configuration illustrated in FIG. 7 is described. Here, the "display control processing" performed when a screen display is provided in the mobile communication terminal 1 having a configuration as described above is described with reference to a flowchart illustrated in FIG. 9. "The display control processing" is started when a display operation on the display unit 160 is performed (e.g., power on of the mobile communication terminal 1, resuming from a sleep mode, or the like).

After the processing has been started, the screen direction determination unit 113 instructs the gravitational direction detecting unit 170 to perform a detecting operation. As a result of the detection obtained by the detecting operation of the gravitational direction detecting unit 170, it thereby determines the screen direction of the display unit 160 (Step S101). That is, the screen direction determination unit 113 determines, on the basis of a gravitational direction acting on the mobile communication terminal 1, which is detected by the gravitational direction detecting unit 170, which of the "vertically long", "horizontally long", or "oblique" direction is the screen direction of the display unit 160.

After the screen direction has been determined, the screen direction determination unit 113 determines whether or not this is a processing step associated with the start of a display operation (Step S102). That is, the screen direction determination unit 113 determines whether or not the determination of the screen direction in Step S101 has been made immediately after the start of the present processing. In this case, because the determination has been made immediately after the start of the present processing, this is determined as a display operation start time (Step S102: Yes). In this case, the screen direction determination unit 113 notifies the display control unit 114 of the screen direction determined in Step S101.

The display control unit 114 performs display processing depending on the screen direction notified by the screen direction determination unit 113 (Step S104). That is, the display control unit 114 performs processing such as rotating or zooming on image data acquired by the image acquiring unit 112, depending on the determined screen direction, to display a resultant image on the display panel 160A.

At the same time, the operation mode processing unit 111 refers to the operation setting table stored in the storage unit 140 to determine whether or not the 3D display mode is enabled ("Display mode" is set to "3D") (Step S105).

If the 3D display mode is enabled (Step S105: Yes), the operation mode processing unit 111 further refers to the operation setting table to determine whether or not the setting that a 3D display is not provided under a predetermined condition is enabled (Step S106). In the case of the operation setting table exemplified in FIG. 8, this corresponds to the case where any of the option "No" for the setting item "3D display in vertically long state", option "Off" for the setting item "Display in oblique state", or option "No" for the setting item "3D display in oblique state" is enabled.

If there is no setting that a 3D display is not provided under a predetermined condition (Step S106: No), the operation mode processing unit 111 notifies the display control unit 114 of this. In this case, the display control unit 114 performs "3D display processing" (described later in detail) which provides a 3D display on the display unit 160 (Step S200).

On the other hand, if the setting exists that a 3D display is not provided under a predetermined condition (Step S106: Yes), the operation mode processing unit 111 determines whether or not the current state of a posture of the mobile communication terminal 1 corresponds to the content of the setting (Step S107). That is, if the option "No" for the setting item "3D display in vertically long state" is enabled, the setting content corresponds to the case where the screen direction determined in Step S101 is "vertically long". Also, if any of the option "Off" for the setting item "Display in oblique state" or the option "No" for the "3D display in oblique state" is enabled, the setting content corresponds to the situation where the screen direction determined in Step S101 is "oblique".

If the current state of the mobile communication terminal 1 does not correspond to the content of the setting that a 3D display is not provided under a predetermined condition (Step S107: No), the operation mode processing unit 111 notifies the display control unit 114 of this. In this case, the display control unit 114 performs the "3D display processing" (described later in detail) for providing a 3D display (Step S200).

On the other hand, the current state of the mobile communication terminal 1 corresponds to the content of the setting that a 3D display is not provided under a predetermined condition (Step S107: Yes), the operation mode processing unit 111 determines whether or not corresponding setting items are intended to indicate the display switch to 2D (Step S108). In the example of the operation setting table illustrated in FIG. 8, this corresponds to when the option "On" for the setting item "Display in oblique state" is enabled, and the option "No" for the setting item "3D display in oblique state" is enabled.

If the setting items indicate the display switch to 2D (Step S108: Yes), the operation mode processing unit 111 notifies the display control unit 114 of this. In this case, the display control unit 114 performs "2D display processing" (described later in detail) for providing a 2D display (Step S300).

On the other hand, if the corresponding setting items do not indicate the display switch to 2D, but indicate "display off" (i.e., the option "Off" for the setting item "Display in oblique state" is enabled) (Step S108: No), the operation mode processing unit 111 notifies the display control unit 114 of this. In this case, the display control unit 114 controls the display unit 160 to stop the display operation, and thereby turns the display off (Step S109).

After the display off processing step, the processing steps in Step S101 and subsequent steps are repeated unless a predetermined termination event (e.g., power off of the mobile communication terminal 1, transition to the sleep mode, or the like) occurs (Step S110: No).

Also, even in the case where the "3D display processing" (Step S200) or "2D display processing" (Step S300) is performed to thereby perform the display operation, the processing steps in Step S101 and subsequent steps are repeatedly performed until the predetermined termination event occurs (Step S110: No).

Figure 10:
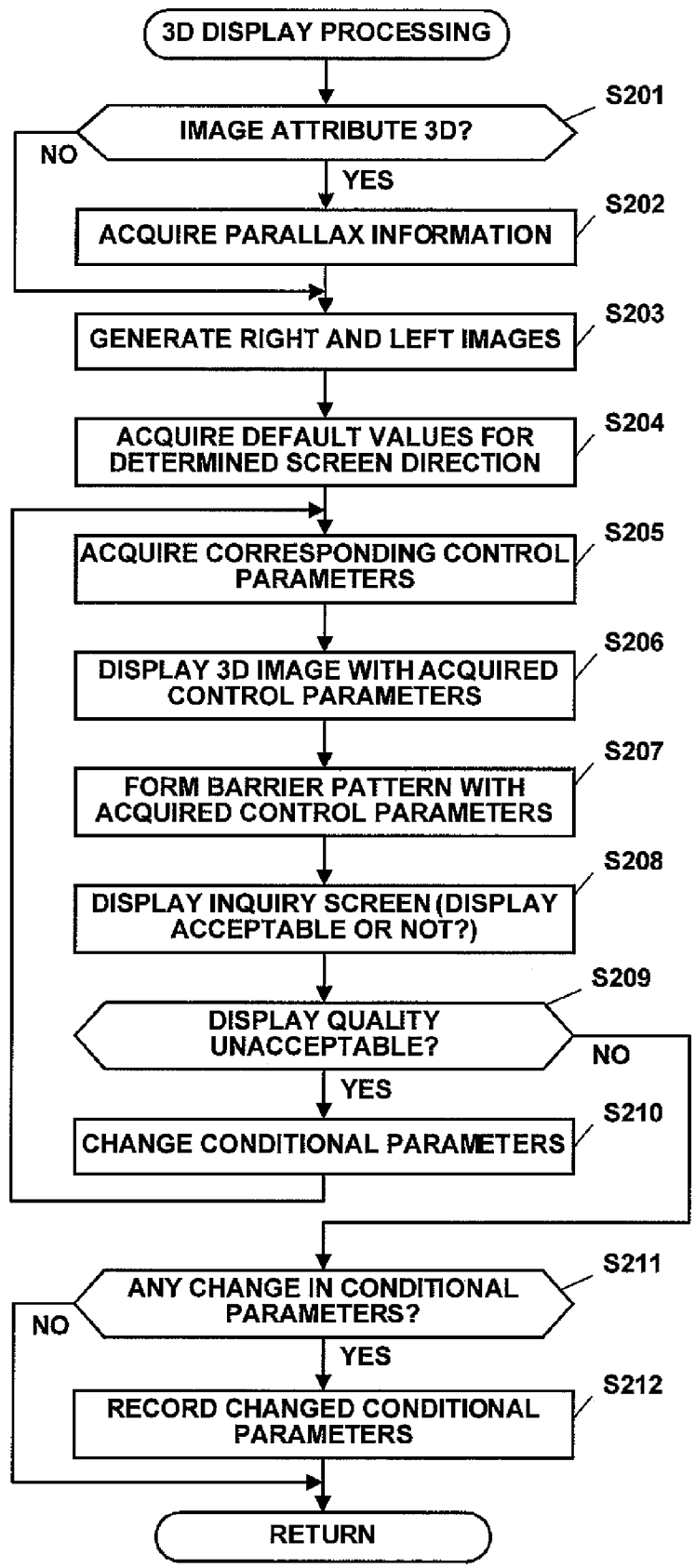
FIG. 10 is a flowchart for describing "3D display processing" performed in the "display control processing" illustrated in FIG. 9.

Here, the "3D display processing" (Step S200) for providing a 3D display, and the "2D display processing" (Step S300) for providing a 2D display are respectively described with reference to flowcharts illustrated in FIGS. 10 and 11. First, details of the "3D display processing" are described with reference to the flowchart illustrated in FIG. 10.

After the processing has been started, the display control unit 114 refers to attribute information on image data that is acquired by the image acquiring unit 112 and a display target, and thereby determines whether or not the image data is generated for 3D display (Step S201).

Note that the image generated for 3D display refers to an image in which, as illustrated in FIG. 4D, a line-based displacement is provided such that a 3D display on the display unit 160 can be provided. In this case, the displacement is based on parallax, and therefore a preliminarily generated 3D image is based on default parallax. If the parallax does not meet the viewing condition at the time when the 3D display is provided in the mobile communication terminal 1, i.e., the distance between eyes and visual distance that are the setting items of the conditional parameters, the 3D display is difficult to visually recognize even if the 3D display is directly provided.

Accordingly, if the display target image is a 3D image (Step S201: Yes), the display control unit 114 acquires from the 3D image parallax information indicating the default parallax applied upon generation of the 3D image (Step S202), and on the basis of the acquired parallax information, generates right and left images as illustrated in FIGS. 4B and 4C (Step S203). In this case, the right and left images are generated by converting the 3D image on the basis of the parallax information.

On the other hand, if the display target image is not a 3D image (Step S201: No), the display control unit 114 applies predetermined parallax (e.g., parallax based on a default distance between eyes and a default visual distance in the conditional parameters) to the acquired image (hereinafter referred to as a "2D image") to generate right and left images as illustrated in FIGS. 4B and 4C (Step S203).

After the right and left images have been generated, the display control unit 114 refers to the "parameter table" in the storage unit 140 to acquire default values of the conditional parameters for the determined screen direction (Step S204). Note that if this 3D display is being shown for the first time in the mobile communication terminal 1, preliminarily provided default values are acquired, whereas if it is not the first time, conditional parameters used upon previous 3D display are acquired as the default values.

Note that if the present processing is started by the change in screen direction (i.e., if the determination in Step S103 of the "display control processing" (FIG. 9) is "Yes"), the conditional parameters employed before the change in screen direction are acquired as the default values. That is, if the screen direction is changed in the middle of the 3D display, the user can be regarded as the same user, and in this case, the distance between eyes is not changed. Besides, the visual distance and also the viewing angle can also be made the same. Accordingly, the conditional parameters before the change in screen direction can be directly applied.

After the conditional parameters have been acquired, the display control unit 114 acquires control parameters related to the acquired conditional parameters (Step S205). That is, control values of the display panel 160A for providing a 3D image display corresponding to the default values of the conditional parameters for the current screen direction, and control values of the parallax barrier panel 160B for making a barrier pattern preferable for the case are acquired.

Then, the display control unit 114 uses the acquired control parameters to control the display panel 160A. Based on this, the 3D image (see FIG. 4D) in which the right and left images generated in Step S203 are respectively arrayed is displayed on the display panel 160A (Step S206).

Also, by using the acquired control parameters to control the parallax barrier panel 160B, the barrier pattern by which the 3D image displayed on the display panel 160A is appropriately visually recognized can be formed on the parallax barrier panel 160B in the determined screen direction (Step S207).

Note that the employed conditional parameters correspond to the determined screen direction, but may not be suited to the current viewing environment because of the use of the default values. If the default values are suited to the current viewing environment, the 3D-displayed image is appropriately visually recognized, but if not, the image is not appropriately visually recognized as a 3D image.

For this reason, the display control unit 114 displays on the display unit 160 a screen that asks the viewer (i.e., user of the mobile communication terminal 1) whether or not the current 3D display is appropriately visually recognized (display quality) (Step S208).

The viewer operates the operation unit 150 to input whether or not the current display quality is acceptable. If the input indicating that the display quality is not acceptable is provided (Step S209: Yes), the display control unit 114 changes the conditional parameters (Step S210) to provide a 3D display using control parameters corresponding to the changed conditional parameters (Steps S205 to S207).

Then, the display control unit 114 displays on the display unit 160 a screen asking the viewer whether or not the 3D display based on the changed conditional parameters is acceptable (Step S208), and if it is not acceptable (Step S209: Yes), further changes the conditional parameters (Step S210).

The change in conditional parameters in Step S210 is made by, e.g. changing combinations of visual distance and default distance between eyes, and then if the 3D display is still unacceptable, a similar combination change is sequentially made with respect to the other distance between eyes.

Figure 9:
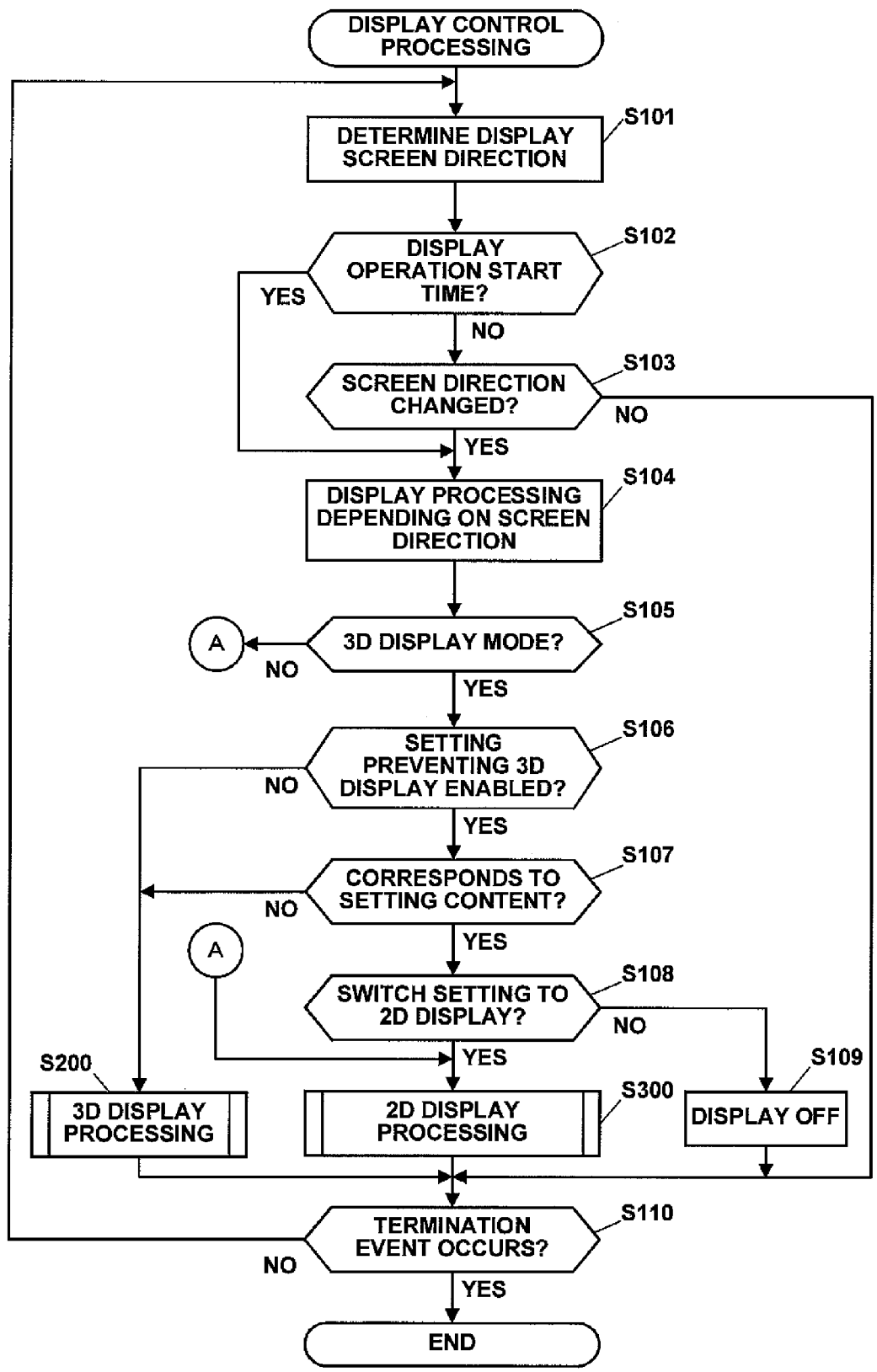
FIG. 9 is a flowchart for describing "display control processing" according to the embodiment of the present invention.

On the other hand, if the input indicating that the display quality of the 3D display is acceptable is provided (Step S209: No), and the acceptable display quality is achieved in the conditional parameters different from the default conditional parameters (Step S211; Yes), the display control unit 114 records the combination of the changed conditional parameters as default (Step S212), and the current flow returns to the flow of the "display control processing" (FIG. 9).

In addition, if the display quality of the 3D display based on the default values acquired in Step S204 is acceptable, and the change in conditional parameters is not made (Step S211: No), the current flow returns to the flow of the "display control processing" (FIG. 9) without updating the default values.

Next, the "2D display processing" (Step S300) that is performed when a 3D display is not provided is described with reference to the flowchart illustrated in FIG. 11.

After the processing has been started, the display control unit 114 refers to attribute information on image data that is acquired by the image acquiring unit 112 and a display target, and thereby determines whether or not the display target image is a 3D image (Step S301).

If the display target image is a 3D image (Step S301: Yes), the display control unit 114 further determines whether or not the present processing has been started because of not being in the 3D display mode (hereinafter referred to as a "2D display mode") (Step S302). That is, the display control unit 114 determines whether or not the present processing has been started because the determination in Step S105 of the "display control processing" (FIG. 9) is "No".

If the display target image is a 3D image, and the display mode is a 2D display mode (Step S302: Yes), the display control unit 114 displays on the display unit 160 a screen that asks the viewer (user of the mobile information terminal 1) whether or not the display mode is changed to a 3D display mode because the display target image is a 3D image (Step S303).

The viewer operates the operation unit 150 to provide input indicating whether or not to make the change to the 3D display mode. If the input indicating the change to the 3D display mode is provided (Step S304: Yes), the display control unit 114 accesses the operation setting table in the storage unit 140 to change the setting of the display mode from the 2D display mode to the 3D display mode (Step S305), and the current flow returns to the flow of the "display control processing" illustrated in FIG. 9.

In this case, unless the termination event occurs (Step S110: No), the processing steps in Step S101 and subsequent steps are again performed, so that in Step S105, the display mode is determined as a "3D display mode" (Step S105: Yes), and therefore the related 3D display processing is performed.

On the other hand, if the display target image is a 3D image (Step S301: Yes), and the start of the present processing meets the condition for making the switch to a 2D display in the 3D display mode (i.e., the determination in Step S108 of FIG. 9 is "Yes") (Step S302: No), the display control unit 114 acquires parallax information of the display target 3D image (Step S306) to thereby generate right and left images as illustrated in FIGS. 4B and 4C.

In this case, because of the operation for making the switch to a 2D display in the middle of the 3D display in the 3D display mode, the 3D image generated for 3D display is converted into the respective right and left images as illustrated in FIGS. 4B and 4C, and one image in which interpolation between the right and left images is performed is generated and set as a display image (2D image) (Step S307).

In this case, the display control unit 114 controls the parallax barrier panel 160B to make the barrier pattern transparent (Step S308). That is, the parallax barrier panel 160B is brought into a state where the light shielding pattern as illustrated in FIG. 5A is absent.

Then, the display control unit 114 controls the display unit 160 to display the 2D image generated in Step S307 on the display panel 160A (Step S309), and the current flow returns to the flow of the "display control processing" (FIG. 9). In this case, the barrier pattern on the parallax barrier panel 160B is made transparent, and therefore the 2D image displayed on the display panel 160A is directly visually recognized.

Also, in the case where the display target image is a 3D image (Step S301: Yes), and the display mode is a 2D display mode (Step S302: Yes), if the input made as a response to the screen displayed in Step S303 is not one asking for the change to a 3D display mode (Step S304: No), a 2D image is generated from the right and left images on the basis of the parallax information on the 3D image; the barrier pattern on the parallax barrier panel 160B is made transparent; and then the 2D image is displayed on the display panel 160A (Steps S306 to S309).

On the other hand, if the display target image is not a 3D image (2D image) (Step S301: No), it is not necessary to generate the right and left images based on the parallax information, and therefore the display control unit 114 makes the barrier pattern transparent, and then displays the 2D image on the display panel 160A (Steps S308 and S309).

Returning to the flow of the "display control processing" (FIG. 9) through such a "2D display processing", the processing steps in Step S101 and subsequent steps are repeatedly performed until the predetermined termination event occurs (Step S110: No). Note that if the determination of the screen direction in Step S101 is made not at the display start time but in the middle of the display operation (Step S102: No), the screen direction determination unit 113 determines whether or not any change in screen direction is made (Step S103).

In this case, only if the change in screen direction is made (Step S103: Yes), the processing steps in Step S104 and subsequent steps are performed, and the display control processing corresponding to the screen direction at the time is performed. That is, if there is no change in screen direction, the above-described display control is not performed (Step S103: No).

Then, along with the occurrence of the predetermined termination event, the "display control processing" is terminated.

Based on the performance of the above-described processing, even if the change in screen direction of the display unit 160 is made by changing the posture (direction) of the mobile communication terminal 1 (casing 11), the display control corresponding to the screen direction at the time is performed, and therefore the 3D display is appropriately visually recognized.

Second Embodiment

In the above-described first embodiment, there is exemplified a case where the electronic device according to the present invention is implemented by the straight or slide type mobile communication terminal 1 as illustrated in FIGS. 1A to 1C; however, the electronic device according to the present invention can also be implemented by a mobile communication terminal having another configuration.

For example, the electronic device according to the present invention may be implemented by, for example, a so-called swing type mobile communication terminal 2 as illustrated in FIG. 12.

In this case, the swing type mobile communication terminal 2 has: as illustrated in FIG. 12, a casing 11 held by a user; and a casing 12 that can be opened/closed with respect to the casing 11, and is structured such that the display unit 160 is configured to rotate in the casing 12. That is, the screen direction of the display unit 160 can be changed without changing a posture (direction) of the casing 11.

Regarding such a swing type mobile communication terminal 2, there are two types, for example, one as illustrated in FIGS. 12A and 12B in which the display unit 160 rotates using the center of the display unit 160 as a rotary shaft (so-called cycloid type, herein after referred to as a "mobile communication terminal 2A"), and the other one as illustrated in FIGS. 12C to 12E in which the rotary shaft of the display unit 160 is offset from the center of the display unit 160 thereof (hereinafter referred to as a "mobile communication terminal 2B").

In the case of the mobile communication terminal 2A, conditional parameters, such as viewing distance and distance between eyes do not vary regardless of whether the rotational direction of the display unit 160 is right or left. Therefore, it is only necessary to prepare one set of conditional parameters used when the screen direction is horizontally long.

On the other hand, the mobile communication terminal 2B in which the rotary shaft of the display unit 160 is offset as illustrated in FIGS. 12C to 12E does not have the same positional relationship as that of the display unit 160 with respect to the user between the case where the display unit 160 is rotated rightward to be brought into a horizontally long state and the case where the display unit 160 is rotated leftward to be brought into a horizontally long state. Accordingly, in the case of the mobile communication terminal 2B having such a type of casing structure, for example, as illustrated in FIG. 16, two sets of conditional parameters for the horizontally long state are desirably prepared for the right rotation and the left rotation, respectively.

That is, the screen directions of the mobile communication terminal 2B in states illustrated in FIG. 12D and FIG. 12E, respectively, are the same "horizontally long" in direction; however, one is in a state rotated by 180° with respect to the other one. Therefore to align images in the same display direction, one image is horizontally and vertically inverted after the rotation. In this case, the screen directions are "horizontally long", and therefore a barrier pattern on the parallax barrier panel 160B may be a stripe pattern in the same direction; however, the display image is inverted, and therefore unless transmission columns and light shielding columns are swapped in position, a so-called "reverse view (phenomenon in which images for left and right eyes are viewed in reverse to each other)" occurs.

Accordingly, in the mobile communication terminal 2B in which the rotary shaft of the display unit 160 is offset as illustrated in FIGS. 12C to 12E, if the screen direction is a horizontally long direction, the control parameters should be prepared for each of the rotational directions. The occurrence of the reverse view can be easily prevented only by using prepared parameters in the display control.

Note that if calculation using control parameters set for one of the rotational directions enables control parameters for the other rotational direction to be obtained, only the control parameters for the one of the rotational directions may be stored in the parameter table in the storage unit 140. This enables a usage of a storage area in the storage unit 140 to be reduced.

For example, in the example illustrated in FIGS. 12C to 12E, if the offset of the rotary shaft of the display unit 160 in FIGS. 12D and 12E is assumed to be ignorable, or if the transition from the screen in FIG. 12A to that in FIG. 12B is allowed for both of the left and right rotations, control can be performed so as to share one set of conditional parameters in the case of the horizontally long screen direction without separately storing the conditional parameters for each of the rotational directions. Only by using determination results for the cases of the left and right rotations to control (replace) the control parameters such that, for example, the relationship between the transparent columns and the light shielding columns regarding the barrier pattern is reversed, the occurrence of reverse view can be easily prevented, and thereby a 3D display image can be appropriately visually recognized.

Figure 17:

Also, if all of the control parameters are adapted and represented by a function using the conditional parameters as the variable, so that values of the control parameters can be obtained from the function every time values of the conditional parameters are obtained, information stored in the parameter table in the storage unit 140 can be limited to the conditional parameters as illustrated in FIG. 17. This enables the usage of the storage area in the storage unit 140 to be further reduced.

Also, as the mobile communication terminal 2 in which the screen direction of the display unit 160 is not linked to the posture (direction) of the casing 11 held by the user, a mobile communication terminal (hereinafter referred to as a "mobile communication terminal 2C") having a casing that opens/closes in two directions as illustrated in FIGS. 13A to 13C, or the like can also be applied with the present invention.

Even in such a mobile communication terminal 2, by performing the processing exemplified in the above-described first embodiment, display control depending on the screen direction of the display unit 160 is performed, and a 3D display image is thereby appropriately visually recognized.

Figure 14:
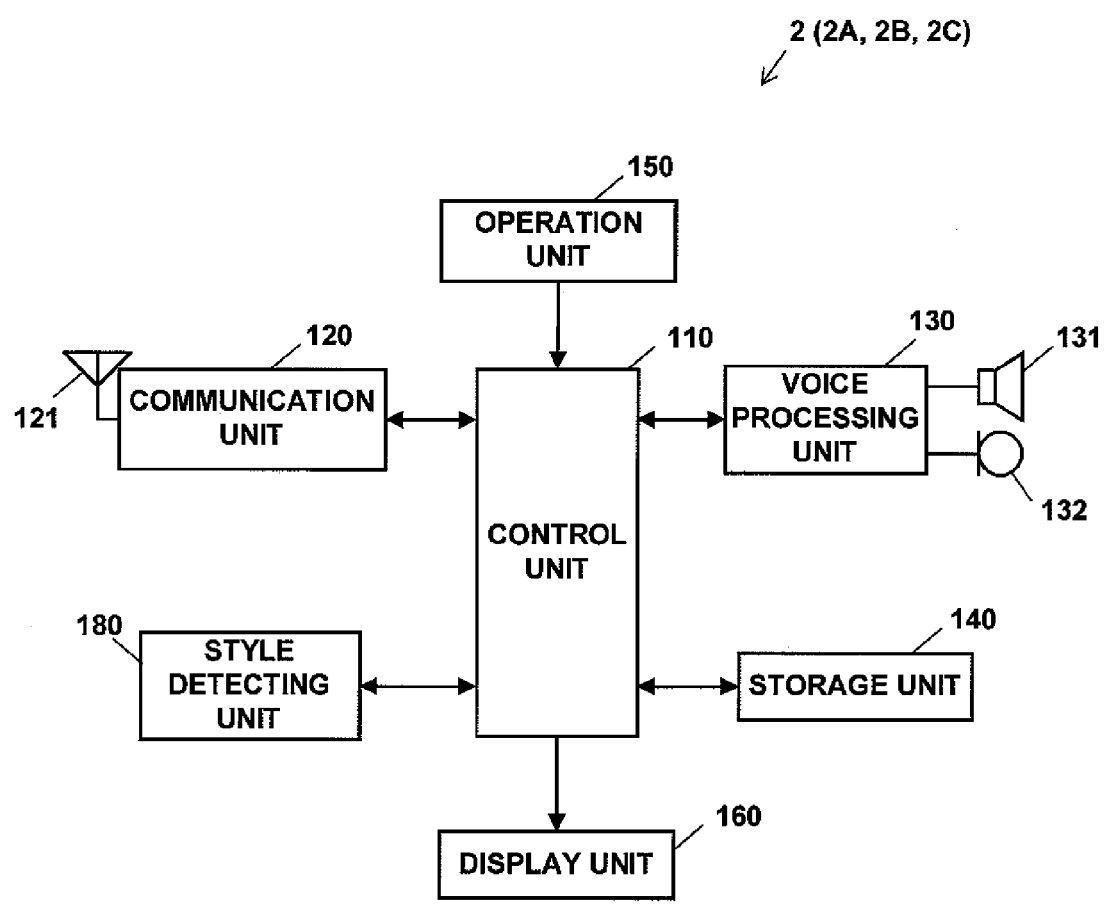
FIG. 14 is a block diagram illustrating an internal configuration of the mobile communication terminal according to the second embodiment of the present invention.

This case is partially different in a configuration for determining the screen direction of the display unit 160 from the mobile communication terminal 1 exemplified in the first embodiment. That is, as illustrated in FIG. 14, a style detecting unit 180 is configured in place of the gravitational direction detecting unit 170 in the first embodiment.

The gravitational direction detecting unit 170 is a part that detects a gravitational direction acting on the mobile communication terminal 1; however, the style detecting unit 180 according to the present embodiment is configured to detect a style of the display unit 160 that varies according to the opening/closing or rotation of the casing. The style detecting unit 180 of the mobile communication terminal 2A or 2B includes a sensor that detects the rotational direction and rotational angle of the display unit 160, and the like, whereas the style detecting unit 180 of the mobile communication terminal 2C includes a sensor that detects an opening/closing direction and opening/closing angle of the casing 12, and the like.

Figure 15:
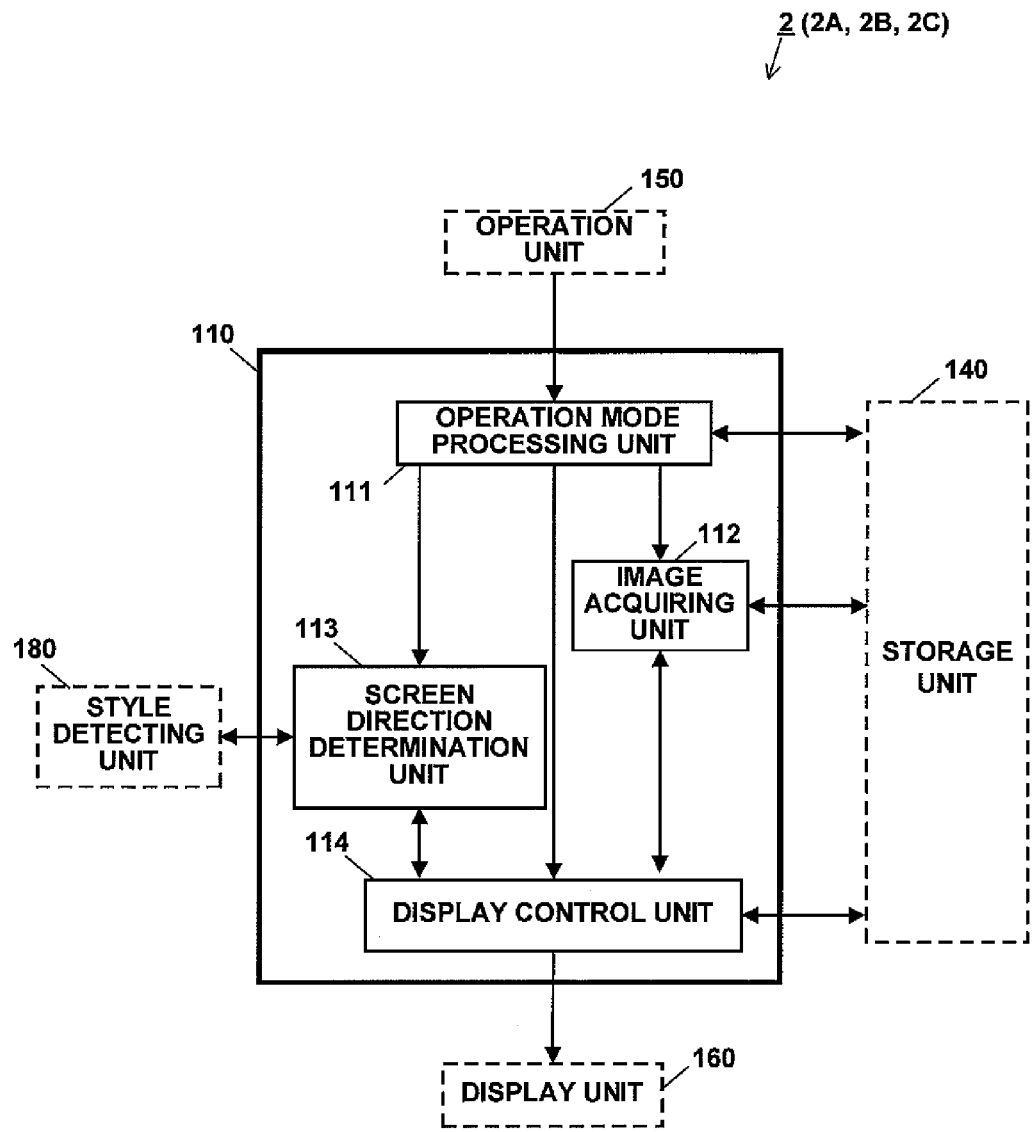
FIG. 15 is a diagram illustrating an example of a functional configuration achieved by the control unit illustrated in FIG. 14.

In the case of the present embodiment, the functional configuration achieved by a control unit 110 is the same as that in the case of the first embodiment; however, as illustrated in FIG. 15, a screen direction determination unit 113 determines, on the basis of a result of the detection by the style detecting unit 180, the screen direction of the display unit 160. In this case, the screen direction determination unit 113 achieved by the control unit 110 of the mobile communication terminal 2B as illustrated in FIGS. 12C to 12E determines not only whether the screen direction of the display unit 160 is a vertically long or horizontally long direction, but also the rotational direction of the display unit 160.

In the mobile communication terminal 2 having such a configuration, by performing the "display control processing" exemplified in the above-described first embodiment, the display control depending on the screen direction of the display unit 160 is performed, and even when the display unit 160 is rotated, or the opening/closing direction of the casing is changed, a 3D display image is appropriately visually recognized.

As described above, by applying the present invention as in the above-described embodiments, a 3D display can be appropriately visually recognized in an electronic device in which the screen direction is changed, such as a mobile communication terminal or the like.

The present embodiment can determine the screen direction on the basis of the detection of the gravitational direction acting on the mobile communication terminal, or the detection of the style of the mobile communication terminal, and can therefore be applied to mobile communication terminals having various configurations.

Also, by using the conditional parameters and control parameters to perform display control, the display control for providing an optimum 3D display can be instantly performed.

Further, the user is asked whether or not the 3D display is acceptable, and on the basis of the response to this, the parameters are changed, so that the display can be improved.

Still further, display control leading to an acceptable display state can be performed in a short time by using changed parameters or previously used parameters.

Yet further, the parallax barrier is controlled to thereby perform display control, and therefore the display control leading to an acceptable 3D display can be performed.

Yet still further, by performing display control so as to prevent a 3D display, a 2D display is separately used from the 3D display to be able to achieve a display easily viewable to the user.

Also, in the case of a vertically long display having a relatively small 3D display visual effect, by performing display control to prevent a 3D display, a display putting more emphasis on ease of viewing than the visual effect can be provided.

On the other hand, in the case of a horizontally long display in which the visual effect based on a 3D display can be expected, by performing display control to provide a 3D display, the display putting emphasis on the visual effect can be provided.

Also, by performing display control to prevent a 3D display when the screen direction is oblique, an easily viewable display can be provided even in a condition in which a 3D display is difficult to visually recognize.

In this case, besides the switch to a 2D display, display control to stop a display operation can also be performed, and therefore a display according to a user's intention can be provided.

Also, display control is performed depending on whether the attribute of a display target image is for 3D or 2D, and therefore a more appropriate display can be provided.

The above-described embodiments are examples, and an applicable scope of the present invention is not limited to any of the embodiments. That is, various applications are possible, and any embodiment can be included in the scope of the present invention.

For example, the above-described embodiment exemplifies the case where the electronic device according to the present invention is embodied by the mobile communication terminal; however, the present invention can be applied to various electronic devices without limitation to the mobile communication terminal if there is provided a display unit that makes the image stereoscopically visually recognizable.

Also, there is exemplified the case where each of the display panel and barrier pattern is embodied by a liquid crystal display panel; however, the present invention can be applied, without limitation to the liquid crystal, with another device if the device can implement each of the display and the barrier, for example, even if the display panel is a self light emitting display device such as an organic EL or plasma display device.

Figure 18:
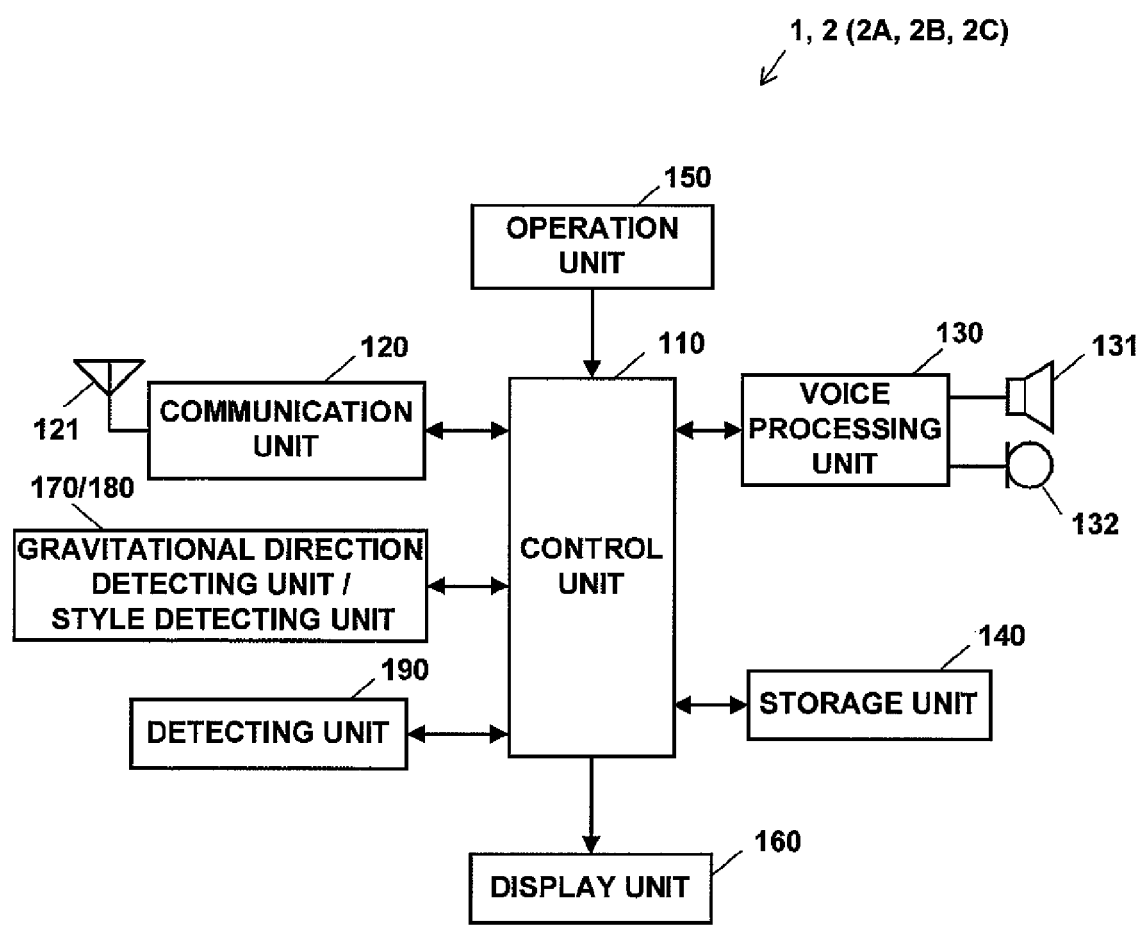
FIG. 18 is a block diagram illustrating another internal configuration of the mobile communication terminal according to the first or second embodiment of the present invention.

Also, the mobile communication terminal 1 or 2 may be configured as illustrated in FIG. 18. A detecting unit 190 in FIG. 18 is implemented by, for example, an imaging device (camera) that can image the face of the user (viewer), image recognition processing unit that can recognize a face, distance sensor, or the like. The detecting unit 190 may be adapted such that it detects distance between eyes from an imaged image, visual distance from the distance sensor, or the like, and on the basis of this, parameters are automatically set.

Further, not only an electronic device preliminarily provided with the configuration according to the present invention but an existing electronic device can be made to function as an electronic device according to the present invention by applying a program to the existing electronic device.

The method for applying such a program is arbitrary, and for example, the program can be applied and stored in a storage medium such as a CD-ROM or memory card, and besides, for example, also applied through a communication medium such as the Internet.

Having described and illustrated the principles of this application by reference to one or more preferred embodiments, it should be apparent that the preferred embodiments may be modified in arrangement and detail without departing from the principles disclosed herein and that it is intended that the application be construed as including all such modifica-

What is claimed is:

1. An electronic device comprising a display unit that can provide a three-dimensional display making an image stereoscopically viewable, wherein the electronic device comprises:
a first casing and a second casing movably connected to the first casing; and
the display unit rotatably configured in the second casing, wherein
the display unit includes a determination unit that determines a screen direction of the display unit by detecting a rotation of the display unit, and;
a display control unit that, on a basis of a result determined by the determination unit, performs a switch control of a display associated with the three-dimensional display:
a parameter acquiring unit that acquires a conditional parameter that changes depending on a condition upon viewing, and a control parameter that is intended to control the display operation of the display unit associated with the conditional parameter;
wherein the display control unit performs the switch control to not to provide the three-dimensional display if a determined screen direction of the display unit is a vertically long direction, and when providing the three-dimensional display, the determination unit further detects whether a rotational direction of the display unit is a left rotation or a right rotation, and
wherein the display control unit performs a different switch control associated with the three-dimensional display in accordance with the rotational direction, that is, the left rotation or the right rotation, and at a start of the three-dimensional display, the display control unit performs the switch control for providing the three-dimensional display that utilizes conditions including a condition on a visual distance associated with a visual recognition of a three-dimensional display used in a previous three-dimensional display, and if an offset from a center of a rotary shaft of the rotatably configured display unit is present, the display control unit switches a control for providing the three-dimensional display on a basis of a direction and a quantity of the offset.

2. An electronic device comprising a display unit that can provide a three-dimensional display making an image stereoscopically viewable, wherein the electronic device comprises:
a first casing; and a second casing movably connected to the first casing, and the display unit is rotatably configured in the second casing, wherein
the display unit includes a determination unit that determines a screen direction of the display unit by detecting a rotation of the display unit, and
a display control unit that, on a basis of a result determined by the determination unit, performs a switch control of a display associated with the three-dimensional display,
wherein the display control unit performs the switch control to provide the three-dimensional display if a determined screen direction of the display unit is a horizontally long direction, and when providing the three-dimensional display, the determination unit further detects whether a rotational direction of the display unit is a left rotation or a right rotation, and
wherein the display control unit performs a different switch control associated with the three-dimensional display in accordance with the rotational direction, that is, the left rotation or the right rotation, and at a start of the three-dimensional display, the display control unit switches to a control for providing the three-dimensional display that utilizes conditions including a condition on a visual distance associated with a visual recognition of a three-dimensional display used in a previous three-dimensional display, and if an offset from a center of a rotary shaft of the rotatably configured display unit is present, the display control unit switches a control for providing the three-dimensional display on a basis of a direction and a quantity of the offset.

3. The electronic device according to claim 1, wherein the display control unit, if a change in the screen direction of the display unit occurs during the three-dimensional display, switches to a control for providing the three-dimensional display in accordance with a changed screen direction of the display unit, by utilizing conditions including a previously used condition on a visual distance associated with a visual recognition of a three-dimensional display before the change occurred in the screen direction of the display unit.

4. The electronic device according to claim 1,
wherein the determination unit further comprises an image determination unit that determines whether or not an image to be displayed on the display unit has been created for the three-dimensional display, and
wherein the display control unit switches to determine whether to provide the three-dimensional display on a basis of a result determined by the image determination unit.

5. The electronic device according to claim 1, wherein the parameter storage unit identifiably stores a parameter used for performing the switch control by the display control unit, such that a default value or a previously used value is identifiable.

6. The electronic device according to claim 1, further comprising:
an inquiry unit that asks a user of the electronic device whether the three-dimensional display is acceptable,
wherein the display control unit changes a condition for a three-dimensional display on a basis of an input in response to inquiry by the inquiry unit.

7. The electronic device according to claim 1 wherein if the determined screen direction of the display unit is in an oblique direction, the display control unit performs the switch control to not to provide the three-dimensional display.

8. The electronic device according to claim 1, wherein performs the switch control so as to stop a display operation in accordance with the determined screen direction of the display unit.

9. The electronic device according to claim 1, wherein the display unit comprises
a display panel that displays the image, and
a parallax barrier that makes the image displayed on the display panel visually recognizable such that parallax occurs,
wherein the display control unit performs the switch control by controlling the parallax barrier.

10. The electronic device according to claim 9, wherein the display panel displays the image in which pixels constituting both of two images with parallax is orderly arrayed in a left-right direction in the screen direction of the display unit,
the parallax barrier includes a pattern formed thereon to transmit the image in a different direction in accordance with an array of pixels constituting the image displayed on the display panel, and the display control unit performs a switch control of a direction of the pattern in the parallax barrier, so as to have parallax in accordance with the determined screen direction of the display unit.

11. The electronic device according to claim 9, wherein the display control unit performs the switch control to not to provide the three-dimensional display by controlling the parallax barrier to transmit the image through an entire portion of the parallax barrier.

12. The electronic device according to claim 1, further comprising: a parameter acquiring unit that acquires at least a conditional parameter containing a condition on a visual distance associated with a visual recognition of the three-dimensional display, and a control parameter associated with an operation control containing a control value of the display unit, which is tied to the conditional parameter, wherein the display control unit switches to a control for providing the three-dimensional display on a basis of the conditional parameter that is tied to the result determined by the determination unit, and the control parameter that is tied to the conditional parameter.

13. The electronic device according to claim 12, further comprising a parameter storage unit that preliminarily stores at least the conditional parameter among parameters acquired by the parameter acquiring unit.

14. The electronic device according to claim 13, wherein the parameter acquiring unit acquires the control parameter by an operation that uses the acquired conditional parameter.

15. A non-transitory computer-readable recording medium recording a program that instructs a computer, which controls an electronic device comprising a display unit that can provide a three-dimensional display making an image stereoscopically viewable, a first casing and a second casing movably connected to the first casing, and the display unit rotatably configured in the second casing, to realize functions comprising:

a determination function for determining a screen direction of the display unit by detecting a rotation of the display unit, and a display control function for performing a switch control associated with the three-dimensional display on a basis of a determined result, wherein the display control function is configured to perform the switch control to not to provide the three-dimensional display if a determined screen direction of the display unit is a vertically long direction, and when providing the three-dimensional display, the determination function is configured to further detect whether a rotational direction of the display unit is a left rotation or a right rotation, and wherein the display control function is configured to perform a different switch control associated with the three-dimensional display in accordance with the rotational direction, that is, the left rotation or the right rotation, and at a start of the three-dimensional display, the display control function is configured to switch to a control for providing the three-dimensional display that utilizes conditions including a condition on a visual distance associated with a visual recognition of a three-dimensional display used in a previous three-dimensional display, and if an offset from a center of a rotary shaft of the rotatably configured display unit is present, the display control function is configured to switch a control for providing the three-dimensional display on a basis of a direction and a quantity of the offset.

16. A non-transitory computer-readable recording medium recording a program that instructs a computer, which controls an electronic device comprising a display unit that can provide a three-dimensional display making an image stereoscopically viewable, a first casing and a second casing movably connected to the first casing, and the display unit rotatably configured in the second casing, to realize functions comprising:

a determination function for determining a screen direction of the display unit by detecting a rotation of the display unit, and a display control function for performing a switch control associated with the three-dimensional display on a basis of a determined result, wherein the display control function is configured to perform the switch control to provide the three-dimensional display if a determined screen direction of the display unit is a horizontally long direction, and when providing the three-dimensional display, the determination function is configured to further detect whether a rotational direction of the display unit is a left rotation or a right rotation, and wherein the display control function is configured to perform a different switch control associated with the three-dimensional display in accordance with the rotational direction, that is, the left rotation or the right rotation, and at a start of the three-dimensional display, the display control function is configured to switch to a control for providing the three-dimensional display that utilizes conditions including a condition on a visual distance associated with a visual recognition of a three-dimensional display used in a previous three-dimensional display, and if an offset from a center of a rotary shaft of the rotatably configured display unit is present, the display control function is configured to switch a control for providing the three-dimensional display on a basis of a direction and a quantity of the offset.

* * * * *